United States Patent
Turgeman et al.

(10) Patent No.: US 12,548,025 B2
(45) Date of Patent: Feb. 10, 2026

(54) SYSTEM, DEVICE, AND METHOD OF TRANSACTION VERIFICATION BASED ON CHALLENGE AND RESPONSE MESSAGES

(71) Applicant: IRONVEST, INC., New York, NY (US)

(72) Inventors: Avi Turgeman, New York, NY (US); Kfir Yeshayahu, Tzur Yigal (IL); Erez Zohar, Hoboken, NJ (US)

(73) Assignee: IRONVEST, INC., New York, NY (US)

( * ) Notice: Subject to any disclaimer, the term of this patent is extended or adjusted under 35 U.S.C. 154(b) by 210 days.

(21) Appl. No.: 18/223,563

(22) Filed: Jul. 19, 2023

(65) Prior Publication Data

US 2023/0368206 A1     Nov. 16, 2023

Related U.S. Application Data

(63) Continuation-in-part of application No. 18/219,677, filed on Jul. 9, 2023, which is a continuation of
(Continued)

(51) Int. Cl.
*G06Q 20/40* (2012.01)
*G06F 21/40* (2013.01)
(Continued)

(52) U.S. Cl.
CPC ....... *G06Q 20/40145* (2013.01); *G06F 21/40* (2013.01); *G06F 21/54* (2013.01); *G06F 21/64* (2013.01)

(58) Field of Classification Search
CPC .................. G06Q 20/00–425; G06F 21/00–88
See application file for complete search history.

(56) References Cited

U.S. PATENT DOCUMENTS 7,801,569 B1 *  9/2010  Zellner ............... H04M 19/041
                                                      455/418
8,112,629 B2 *  2/2012  Schneider ............... H04L 67/14
                                                      713/168
(Continued)

*Primary Examiner* — Chenyuh Kuo
(74) *Attorney, Agent, or Firm* — AlphaPatent Associates Ltd.; Daniel J. Swirsky

(57) ABSTRACT

Computerized method for verification of user identity and transaction data authenticity, usable in systems having an electronic device that communicates with a remote server. The method includes: (a) receiving user interactions at a non-secure execution environment of the electronic device, reflecting transaction data entered by a user; and transmitting transaction data from the non-secure execution environment to the server; (b) locally authenticating the transaction data and user identity in a secure execution environment of the electronic device; and encrypting transaction data in that secure execution environment, by utilizing a Cryptographic Private Key of the electronic device as encryption key; and transmitting encrypted version of locally-authenticated transaction data from the electronic device to the server. Then, at the server: (c1) receiving the transaction data that was sent in step (a) from the non-secure execution environment to the server, and delaying transaction execution until arrival and verification processing of the encrypted version; (c2) receiving the encrypted version, and decrypting it by utilizing a Cryptographic Public Key of the electronic device as decryption key; (c3) checking whether or not transaction data obtained in step (c1), match transaction data obtained in step (c2); and if they do no match, then: generating a signal that voids or cancels the transaction.

3 Claims, 2 Drawing Sheets

Related U.S. Application Data application No. 17/114,579, filed on Dec. 8, 2020, now abandoned.

(60) Provisional application No. 63/369,597, filed on Jul. 27, 2022, provisional application No. 62/957,236, filed on Jan. 5, 2020.

(51) Int. Cl.
*G06F 21/54* (2013.01)
*G06F 21/64* (2013.01)

(56) References Cited

U.S. PATENT DOCUMENTS

| | | | |
|---|---|---|---|
| 10,372,894 B2* | 8/2019 | Kim | G06F 21/83 |
| 11,714,170 B2* | 8/2023 | Smits | G01S 17/003 |
| | | | 356/5.01 |
| 2009/0138405 A1* | 5/2009 | Blessing | H04L 63/1466 |
| | | | 705/67 |
| 2012/0246079 A1* | 9/2012 | Wilson | G06Q 20/3226 |
| | | | 705/67 |
| 2012/0306632 A1* | 12/2012 | Fleizach | G06F 3/0488 |
| | | | 340/407.2 |
| 2016/0212079 A1* | 7/2016 | Oliver | G06Q 10/107 |
| 2017/0186011 A1* | 6/2017 | Lieberman | G06Q 20/40145 |
| 2019/0289463 A1* | 9/2019 | Glouche | G06F 21/43 |
| 2019/0303551 A1* | 10/2019 | Tussy | G06V 40/172 |
| 2020/0195639 A1* | 6/2020 | Chien | H04L 63/0876 |
| 2020/0280750 A1* | 9/2020 | Nakamura | H04L 65/764 |
| 2020/0311449 A1* | 10/2020 | Parupati | G06V 10/145 |
| 2021/0097260 A1* | 4/2021 | Verma | G06V 40/45 |

* cited by examiner

SYSTEM, DEVICE, AND METHOD OF TRANSACTION VERIFICATION BASED ON CHALLENGE AND RESPONSE MESSAGES

CROSS-REFERENCE TO RELATED APPLICATIONS

This patent application claims priority and benefit from U.S. 63/369,597, filed on Jul. 27, 2022, which is hereby incorporated by reference in its entirety.

This patent application is also a Continuation-in-Part (CIP) of U.S. Ser. No. 18/219,677, filed on Jul. 9, 2023, which is hereby incorporated by reference in its entirety; which is a Continuation of U.S. Ser. No. 17/114,579, filed on Dec. 8, 2020, which is hereby incorporated by reference in its entirety; which claims benefit and priority from U.S. 62/957,236, filed on Jan. 5, 2020, which is hereby incorporated by reference in its entirety.

The above-mentioned U.S. Ser. No. 18/219,677 also claims benefit and priority from U.S. 63/369,597, filed on Jul. 27, 2022, which is hereby incorporated by reference in its entirety.

FIELD

The present invention is related to the field of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include devices, systems, and methods of user authentication and/or transaction verification.

For example, a method comprises: (a) monitoring interactions of a user who interacts with an electronic device to enter transaction data, and extracting one or more biometric traits of the user; (b) generating a unified data-item, that represents a unified fusion of both (i) the transaction data, and (ii) biometric data reflecting the one or more biometric traits of the user that were extracted from interactions of the user during entry of transaction data. For example, the transaction data within the unified data-item that is generated in step (b), cannot be modified or corrupted without also causing modification or corruption of the biometric data within the unified data-item; wherein the biometric data within the unified data-item that is generated in step (b), cannot be modified or corrupted without also causing modification or corruption of the transaction data within the unified data-item. Modification or corruption of the transaction data within the unified data-item, automatically causes modification or corruption of the biometric data within the unified data-item; and modification or corruption of the biometric data within the unified data-item, automatically causes modification or corruption of the biometric data within the unified data-item.

The present invention may provide other and/or additional benefits or advantages.

DETAILED DESCRIPTION OF SOME DEMONSTRATIVE EMBODIMENTS

Figure 1:
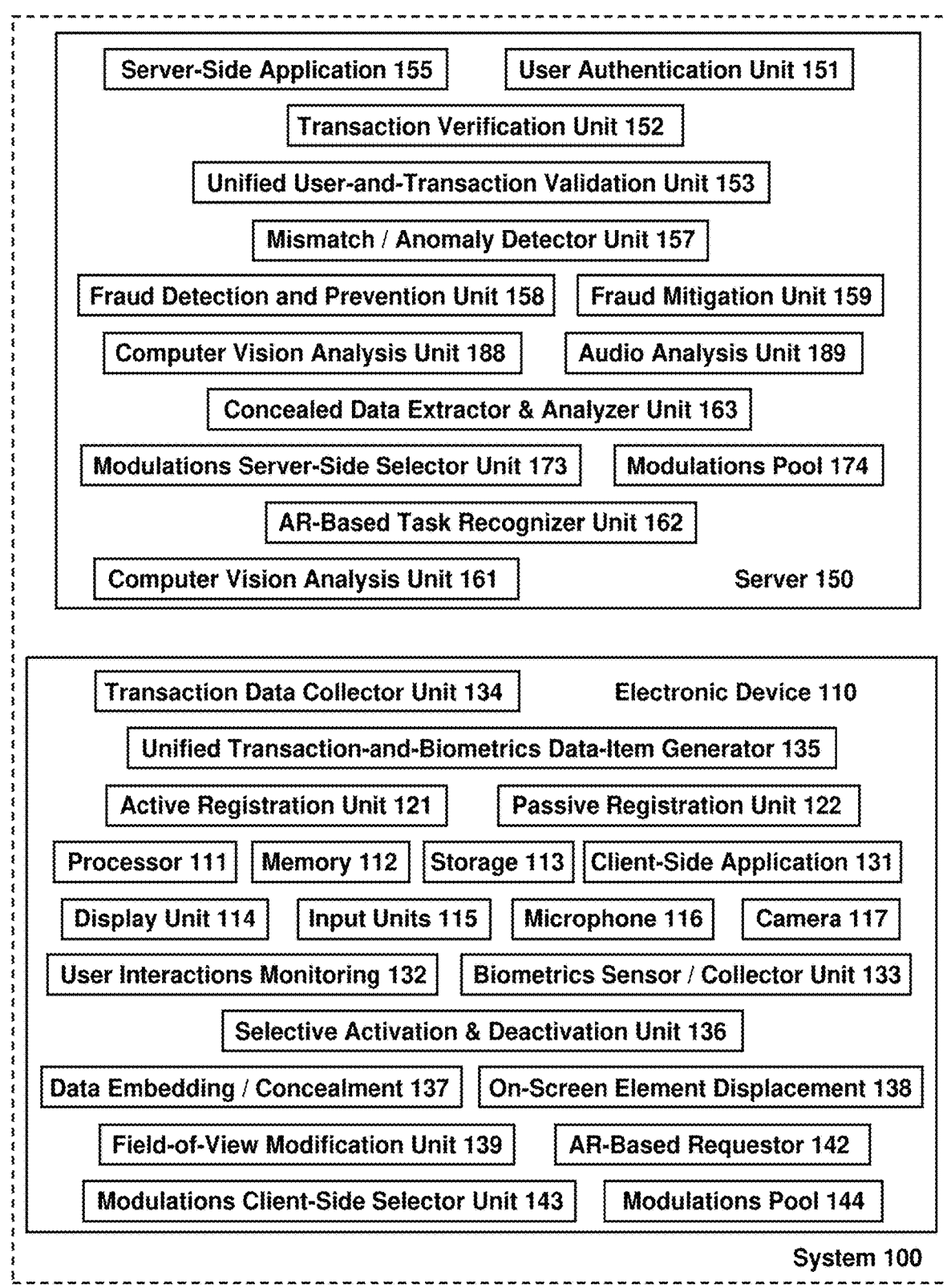
FIG. 1 is a schematic block-diagram illustration of a system, in accordance with some demonstrative embodiments of the present invention.

The present invention provides novel cybersecurity identity authorization and fraud detection methods, as well as systems and devices for implementing or executing such methods. For example, the method of the present invention fuses or combines or aggregates biometric data and transaction information into a single data channel or a single data stream or a single data vector, in order to simultaneously (I) encode (or digitally represent, particularly using cryptographic methods such as encryption) the user identity and (II) validate the user's transaction information. The system and method of the present invention may be utilized in any suitable transaction context, such as, for example: transferring money or wiring funds to another person or entity in a banking application or "app" or website or web-based interface; transferring a cryptocurrency or paying via cryptocurrency; performing a wire transfer or an electronic funds transfer; performing an online purchase transaction or an electronic commerce (e-commerce) transaction at an online retailer or an online vendor; performing other type of online banking transaction or online brokerage transaction; performing other types of financial transactions or commercial transactions; or the like.

A demonstrative system in according to the present invention may include the following parties: (a) User who transacts; (b) Digital application on which the transaction UI or GUI exists or is displayed or is otherwise communication (e.g., a web application, a website, a web-page, a web-friendly application, a stand-alone or native application or "app", a downloadable application, an application that runs within a web browser); and (c) an external (e.g., remote) server for secure processing.

In some embodiments, in addition to directly authenticating users and transactions, the system may pose a requirement for the user (who attempts to initiate a transaction) to be recorded (e.g., to have his video and/or audio be recorded or captured or acquired); and this requirement by itself may dissuade or prevent at least some malicious users or attackers from performing a fraudulent transaction, as they do not want to provide their true identities and do not wish to have their image or audio recorded or captured or acquired; and this by itself may reduce fraud, and/or may homogenize attack vectors.

The Applicants have realized that at the core of a typical digital transactional system lies a fundamental separation between (I) "authentication" of a user, and (II) "verification" of a particular transaction that the user performs. For example, realized the Applicants, in a conventional banking website or application, a user is authenticated with their username and password; and then, at a later time-point and as a separate step, their particular transaction is verified. The Applicants have realized that this gap between authentication and verification may often be exploited by attackers, yet conventional cybersecurity systems continue to accept this axiomatic distinction and this gap. For example, realized the Applicants, stronger password protection only concentrates on user authentication, whereas advanced encryption of data only concentrates on transaction verification. The Applicants have realized that even advanced AI-based cybersecurity systems accept this distinction and this gap.

The system and method of the present invention unify authentication and verification into a single paradigm or into a single unified process or step or into a gap-less process. Specifically, the system of the present invention authenticates the user through biometrics, and then decodes the transaction from the biometric representation itself. Therefore, in accordance with embodiments of the present invention, it would be virtually impossible to forge or to fake a user's identity without also corrupting the transaction itself at the same time, and it would be virtually impossible to manipulate the digital representation of the transaction without simultaneously nullifying or affecting the biometric data that represents and authenticates the user's identity. The present invention thus provides a significantly more robust version of security and cybersecurity.

In some embodiments, the system and method of the present invention create a unified channel or a unified stream of data, which combines or fuses or encodes therein: digital data entered by the user (e.g., monetary amount to be transferred; recipient or beneficiary name and account number), and digital video data captured by the camera of the end-user device (e.g., one or more selected frames from a video that is recorded while the user is performing the transaction). Optionally, the video data reflects real-life or physical or "analog" events or phenomena that may have occurred during the recording of the video, which may be used for transaction verification purposes.

In some embodiments, optionally, the data that is encode into one or more video frame(s) may include one or more digital data-items that relate to the transaction being entered and/or submitted, including (but not limited to) data representing or indicating one or more digital background events that cause or that yield the transaction details; for example, in addition to encoding digital data representing "$625" as a wire transfer amount, the encoded data may further include a representation of one or more underlying JavaScript events that were triggered by keypresses of the user entering such data, or data indicating on-screen gestures and on-screen interactions of the user typing or entering such data via a touch-screen, and/or other digital background events or digital underlying events which the system may sense and collect and may then selectively encode into one or more video frame(s), as described herein.

In some embodiments, the transaction data is encoded into one or more of the video frames. In some embodiments, the system injects or generates or creates one or more real-world phenomena or events that cause, directly or indirectly, an effect on the video being recorded, and the system then verifies (e.g., at a remote server, and/or in the end-user device) that the recorded video indeed reflects such injected phenomena or such inserted events. For example, the end-user device may vibrate in accordance with a particular pattern while the video is being recorded or captured; and the captured video may then be analyzed to verify that its content indeed reflects that pattern of vibrations; accordingly, an "analog" or real-world event, or its real-life effect or result or interference or interfering event, is injected or added or inserted indirectly into the digital video recording or is augmenting the content of the video recording, in order to assist in verification and/or authentication. Similarly, the end-user device may generate one or more audio sounds or particular beeps or particular noises, or may emit pre-defined sounds or utterances, while the video and audio are being recorded; and the captured video and audio may then be analyzed to verify that their content indeed reflects the generated audio.

In another example, the end-user device may be configured by the system to generate selectively-modulated illumination or illumination-patterns or illumination-bursts, via a "flash" illumination unit of the end-user device (e.g., particularly a tablet or a smartphone equipped with a camera coupled to an illumination unit), or to otherwise cause on-screen projection or in-screen projection of one or more illumination patterns or colors; and concurrently, a video is being captured by a camera of the end-user device, and the captured video may then be analyzed to determine whether its content indeed shows an illumination pattern or an illumination signature that matches the illuminated pattern that is known to the system. For example, an illumination unit or a "flash" illumination unit of the end-user device, may be commanded to illuminate in accordance with a pre-defined illumination pattern, such as, "1-0-1-1-0-1-0-0-1-1-1", wherein "0" indicates non-illumination for one second, and wherein "1" indicates illumination for one second; and the content of the captured video may be analyzed to determine whether it reflects such precise changes in illumination, in accordance with such timing and sequence. In another example, the screen of the end-user device may be configured by the system to change its background color, or to have a flashing border or margin, in accordance with such pattern; and the content of the captured video may be analyzed to determine whether it reflects such precise changes in illumination, in accordance with such timing and sequence.

Some embodiments of the present invention may thus operate to detect or prevent or eliminate or mitigate fraudulent transactions or fraud attempts, that are performed or attempted by a human attacker or impostor, or by an automated malware or trojan or malicious program or malicious script. Some embodiments may generate an alert notification or a warning message upon such detection of fraud or possible fraud; and may send or transmit such notification to a human auditor, to a fraud handling department, to a cyber-security team, to a system administrator, to an automated malware protection unit or malware removal unit, or to other entities. Some embodiments may automatically trigger or perform, automatically and/or autonomously, one or more fraud mitigation operations upon such detection; for example, by placing a hold or a freeze or a blocking command on a transaction or an account, or by requiring the user to perform re-authentication or multiple-factor authentication, or by requiring the user to re-try the transaction or to re-enter one or more of the transaction details, or by requiring the user to contact a customer service representative by phone or in person, or the like.

The following is a demonstrative method, in accordance with some embodiments of the present invention.

In a first step of the method, a biometric representation of the user is created and stored. This may be achieved through active or passive registration.

For example, the biometric representation of a user may be created or generated actively via an Active Registration Unit, by recording audio and/or video of the user or a single image or the user or a set of several images of the user (e.g., via a camera and/or a microphone) and optionally, in some implementations, also requesting that the user performs a pre-defined behavioral gesture or task (e.g., in some implementations, requiring the user to move his face in a particular pattern) to facilitate the information that is required for establishing a full biometric representation. In some embodiments, this implementation may require that the user would have been validated previously as the true (genuine, legitimate) user, such as via a password or via two-factor or multi-factor authentication, to ensure that the biometric representation is correct.

Alternatively, in some implementations, the biometric representation of the user may be created or generated passively, via a Passive Registration Unit, in a manner that is transparent to the user, by recording the user interacting with the interface (e.g., as discussed below) during one or more usage sessions. Optionally, these usage sessions can then be validated through a third party or by an external mechanism, and the recordings can be used to passively create a biometric representation of the user. As an example of such external validation, the transaction may be a wire transfer of User Adam; the banking system may detect that User Adam routinely performs a wire transfer of $2,400 on the first day of every calendar month towards User Bob; the banking system detects that after several such regular or repeated transfers, there are no complaints or allegations of fraud or other objections from User Adam (e.g., in response to emails and text messages that notify User Adam that an outgoing wire transfer was commanded in his bank account); and thus, the banking system is confident that these wire transfers are valid and legitimate and are non-fraudulent. Accordingly, the system of the present invention may be configured to passively "watch" or monitor several such transactions of User Adam, and to wait for an indication from the banking system that these transactions are legitimate and non-fraudulent; and a user profile for User Adam may then be constructed, retroactively, based on the behavior of the user as recorded and/or monitored during those legitimate transactions.

In some embodiments, once the biometric representation has been created or generated, via passive user registration or by active user registration or by a hybrid process of active and passive user registration, the raw images and video need not be stored, or may be deleted or discarded, thereby ensuring or increasing privacy for the user.

In a second step of the method, when the user opens or launches or accesses the application or website or web-page in order to perform or submit a transaction of any kind, a webcam or camera or imager (and optionally also a microphone) on the user's electronic device (e.g., smartphone, tablet, laptop computer) is enabled or activated or turned on, and automatically begins recording and capturing the field-of-view, thereby recording or capturing a video (and optionally also audio; or, in some embodiments, by capturing one or more images of the user at particular time-points that are defined as important and relevant from the point of view of authenticating the user and verifying the transaction) of the user's face and/or facial expression and/or head and/or behavior and/or gestures and/or pose and other user-related images or video or sound; in some implementations, capturing of a video, or of one or more images, of the user's face or face-area or head or head-area (e.g., from the shoulders up, or from the neck up, or from the chin up) may suffice. In some embodiments, this ongoing video recording may be shown in real-time to the user on the screen of his electronic device, along with (or within) the application itself. For example, this video that is being recorded or captured, may be shown to the user in the background of the application, with the application material overlaying; or it may be shown as a separate element or component on the screen; or as an internal window or tab; or as a picture-in-picture playback; or using other suitable on-screen location and styling methods. In some embodiments, the video continues recording and the video (and/or audio) continue to be captured by the electronic device, until the user completes a pre-specified or pre-defined action or set of operations, such as, until the user finalizes a set of actions for commanding to send out a transfer of funds, or until the user finished clicking or tapping on a final "submit transaction" button or link or GUI element. In some embodiments, the recording or acquisition of video and/or audio may optionally continue for a short period of time (e.g., 1 or 2 or 3 more seconds) beyond the final act performed by the end-user; in order to capture a small amount of post-transaction or post-submission events, as it may sometimes take the end-user device a short period of time to completely stop an intervening event or an injected event or a fixed action pattern that was initiated during the transaction submission process; for example, a five-seconds Vibration Pattern that was introduced into the transaction submission process, may terminate slightly after the quick user has already tapped his "submit transaction" button or link, and thus some implementations may optionally capture or record a few additional seconds of video and/or audio even after the transaction was submitted.

In a third step of the method, when the user opens or launches or accesses the application or website, an external (remote) server sends to the user's electronic device a unique digital key or digital token or other digital data-item or digital verification item for that transaction. Optionally, through a random or pseudo-random process, this unique digital key, combined with timestamps and other information about the electronic device and the application (e.g., the MAC address of the electronic device; its current Internet Protocol (IP) address; an exact version and build number of the Operating System and/or of the relevant application; the local time as reported by the electronic device; the time zone as reported by the electronic device; or the like), may then be utilized to uniquely determine the random processes and encodings used throughout this technique. For example, a first end-user device of User Adam, who attempts to performs a wire transfer operation via his iPhone, may be assigned or allocated a first process for unified user authentication and transaction verification; whereas, a second end-user device of User Bob, who attempts to perform a wire transfer operation via his Samsung Galaxy smartphone, may be assigned or allocated a second, different, process for unified user authentication and transaction verification; each process being determined in a selection process or in a construction process that takes into account, for example, the unique digital key of each session or transaction, and other user-specific or device-specific parameters or characteristics.

In step four of the method, one or more images or frames of the captured video are encoded with (or augmented with) information about the user's interaction with the application or with the end-user device. These can be encoded in one or more ways, as discussed above and/or herein. Images or frames from the video are sent, periodically or from time to time, or continuously or substantially continuously, to the external (remote) server for processing.

In step five of the method, when requested by the application, the external (remote) server performs the following: (a) It authenticates the user's identity, by matching the biometric profile to the images or frames from the application-recorded video; and also, substantially simultaneously, (b) it validates or verifies the transaction details by decoding the information that was encoded into the recorded images or frames; and also, substantially simultaneously, (c) it verifies the liveliness of the user and/or the freshness of the transaction (e.g., protecting from a replay attack; or protecting from a spoofing attack, in which an attacker utilizes an image or a mask or a deep-fake image or a deep-fake video of the legitimate user). The authentication information is then securely returned or sent to or transferred to the application and/or to the relevant application server (e.g., in an implementation where Server 1 performs or handles the authentication and verification, and Server 2 performs or handles the actual transaction) and/or to the relevant server that is responsible with actually performing the user-submitted transaction (e.g., the banking server of the bank, or a cloud-computing server of the bank which runs the server-side banking application).

In some embodiments, for users who do not yet have a biometric profile created for them, the system may still provide authentication, as described further herein in relation to "First Time Users".

In accordance with some embodiments, the processing power, the bandwidth, and/or the memory resources (or other resources) of the electronic device of the end-user, which may be required for locally executing the application and for performing the client-side operations, may be independent of the length of the session or of the type of the transaction. For example, instead of capturing-and-sending, or streaming, an entire video of the session (or, a video of a segment or a time-slot of the session) to an external remote server, the system instead may operate to selectively capture image snapshot(s) or screen grabs or selected frames at discrete moments in time or at pre-defined time intervals or time-points (e.g., every second) or at pseudo-random time intervals or time-points (e.g., at time intervals that are selected randomly from the range of 0.5 seconds to 0.9 seconds), or at particular time-points during the transaction or during the transaction entry process or during the transaction submission process that are defined or pre-defined as "strategic" or as "important and relevant" from the point-of-view of authenticating the user and/or verifying the transaction (e.g., as non-limiting examples, at a time-point in which the user types in a beneficiary name for a wire transfer; at a time-point in which the user enters a bank account number of a recipient of a wire transfer; wherein each type of transaction may be associated with a pre-defined set of such time-points that are defined as strategic or important for this type of transaction); and then sends to the remote server only those images or frames, or even their partial and/or encoded representation. The events triggering these snapshots, or the conditions that cause the selective grabbing or capturing or isolating of particular video frames for transmission to the remote server, may vary from session to session or from user to user or from device to device (e.g., may vary across two different usage sessions of the same user, such as on two different days), or may vary from application to application (e.g., may vary from the application used by Bank A, to the application used by Bank B). In some embodiments, they may typically include video frames or video segments or video portions that correspond, at least, to any time-window in which the user has actively interacted with his electronic device, and/or any time in which the user types on the device or taps or clicks or scrolls the screen, and/or any time in which the user interacted via touch gestures with a touch-screen of the electronic device, and/or any time in which the user interacted with one or more GUI elements or with a touch-pad or touch-screen or mouse or keyboard or on-screen keyboard, and/or any time in which the user entered data into the application (e.g., entered or typed or pasted any username or password or other credentials, or monetary amount, or beneficiary details), and/or any time that the application itself was closed or started or launched or otherwise interacted with, and/or one or more routine images or video frames that are captured and sent on a regular basis, such as, at pre-defined time intervals (e.g., once per two seconds), or at random or semi-random time intervals (e.g., at a random time interval that changes randomly in the range of 4 to 6 seconds). In some embodiments, a video is captured and stored locally on the end-user device during the entry of the data of the transaction by the user; and then, optionally, the video is encoded or re-encoded or augmented to further encode therein one or more transaction-related data; and then, the captured video is uploaded or is transmitted from the end-user device to the remote server, which in turn processes the video and analyzes its content to determine whether the content reflects one or more modulations or events that were introduced to (or by, or at) the end-user device during the capturing of the video. In other embodiments, a live video feed is acquired and uploaded in real time, as a live streaming video, from the end-user device to the remote server, during the data-entry of the transaction; and the remote server analyzes the content of the streamed video feed to determine whether it reflects one or more modulations or events that were introduced to (or by, or at) the end-user device during the capturing of the video. In other embodiments, the video may be streamed or uploaded in real time from the end-user device to the remote server, and also, the video may be captured locally or saved locally from the end-user device to the remote server after the transaction has already be submitted; and both the real-time streamed video, and the recorded and uploaded video, may be analyzed at the remote server, for double confirmation or dual confirmation; and this mechanism may be useful, for example, in a situation where the end-user device has a low-bandwidth Internet connection during the submission of the transaction, which may or may not suffice for streaming high-quality video to the remote server in real time, and thus the post-transaction video uploading may be uploaded (e.g., a few seconds or minutes or even hours) after the transaction was submitted, for further processing; and optionally, the transaction processing server may put a temporary "hold" or "freeze" on the submitted transaction until it receives the uploaded video and processes it. In other embodiments, the streaming of real-time video and/or the uploading of recorded video, may be implemented as streaming and/or uploading of one or more selected frames or images, and/or as streaming and/or uploading of one or more selected video-segments or time-slots, and/or as streaming and/or uploading of one or more selected audio portions. In some embodiments, the processing of the video may be performed exclusively at the remote server; or, may be performed exclusively locally at the end-user device; or, may be performed partially at the remote server and partially at the end-user device; or, may be performed in parallel by both the remote server and the end-user device. Other suitable mechanisms may be used.

Some embodiments may utilize one or more suitable means of combining or fusing or merging together: (i) the user generated input (e.g., the transaction data that the user entered via his electronic device), and (ii) the user biometric information (e.g., as captured by the camera and/or microphone of the electronic device and/or by other sensors of the electronic device), into a single unified channel or a single or unified data-item or datagram or message or data-stream or information vector, which represents concurrently both of those items. In some embodiments, the system may be agnostic to the means by which the user information and/or biometrics are integrated into the unified representation; and/or the system may simultaneously use two or more of such techniques, for example, in order to increase security and/or reliability. As mentioned above, the single unified channel that is generated and utilized by the system may include, optionally, one or more digital data-items that relate to the transaction being entered and/or submitted, including (but not limited to) data representing or indicating one or more digital background events that cause or that yield the transaction details; for example, in addition to encoding digital data representing "$625" as a wire transfer amount, the encoded data may further include a representation of one or more underlying JavaScript events that were triggered by keypresses of the user entering such data, or data indicating on-screen gestures and on-screen interactions of the user typing or entering such data via a touch-screen, and/or other digital background events or digital underlying events which the system may sense and collect and may then selectively encode into one or more video frame(s), as described. Some of the techniques which may be used, may be device specific and/or application specific, and/or may depend on the particular electronic device being used and/or on the particular application or implementation.

In some embodiments, optionally, the system may perform encoding of every keystroke that a user performs (or, every Nth keystroke), into one or more corresponding (or non-corresponding) frames of the video that is captured; such as, via secure watermarks, or by hidden watermarks, or by embedding suitable watermark(s) into selected video frame(s) and/or into all or most of the video frame(s) that are captured and/or that are transmitted to the remote server. Some embodiments may utilize steganography techniques in order to store and conceal data (e.g., keystrokes, device-specific data, user-specific data) into images or frames or video or audio. In some embodiments, when user Adam enters his name "Adam" through a physical keyboard or an on-screen keyboard, a digital encoding or representation of the letter "A" is added to Frame Number P of a video being captured while he types; then, a digital encoding or representation of "d" is added to Frame Number P+4 of the video being captured while he types; and so forth, thereby encoding a digital representation of each keystroke into a separate frame of the captured video. In some embodiments, Use Adam may type the letter "A" when the camera is capturing Frame number F, and the actual encoding of the representation of the letter "A" may be performed into a subsequent frame, such as Frame number F+3, as it may take a slight time period to generate the encoded data and/or to add it. In some embodiments, "keystrokes" may include incorrect data or typographical errors typed by the user; such as, adding a digital encoding or representation of a "backspace" or a "delete" keystroke or a CTRL or Shift key-press, or the like. Later, a remote server may reject the transaction or block it, based on the existence or based on the lacking of a particular keystroke, from the data encoded into frame(s) of the video; and/or based on the timing of such data. For example, a transaction may be blocked or rejected if the data submitted by the transaction form indicates that the user name is "Janet", while the keystroke data that was encoded into the relevant particular frames of the video indicates that the submitting user has actually typed the letters for "Emily" (five characters, but different characters) or for "Jane" (different number of characters, even though the first four characters are the same).

In some embodiments, optionally, for touch sensitive screens or touch-screens, encoding the spatial or geographical location of the electronic device of the user (e.g., obtained via GPS, or via Wi-Fi based location detection, or via other suitable location finding techniques, or based on data sensed by spatial orientation sensor(s) of the device), and/or the size or other properties of the interaction of the user with the electronic device (e.g., the size of the fingerprint of the user on the touch-screen in a particular interaction), and/or the time duration or time-length of each time the user interacts with the touch screen (e.g., presses, types on, swipes, clicks, taps, scrolls, or the like); wherein such information is inserted or injected or encoded into one or more frames of the video that is or was captured. For example, User Bob clicks on a drop-down menu of "select payee" via his touch-screen; the electronic device senses that (i) the size of the fingerprint is approximately a circle having a diameter of 84 on-screen pixels, and that (ii) the touch duration for this on-screen touch operation was 0.70 seconds; and these two items of information, such as D=84 and T=0.70, may be encoded or digitally added into one frame or into several frames of the video that was captured during the transaction entry process.

In some embodiments, optionally, for end-user devices having one or more accelerometers, such as some smartphones or tablets or smart-watches, the system may perform and utilize encoding the accelerometer data (e.g., the data sensed or measured by the accelerometer(s) of the electronic device) into one or more frames of the video captured during the data entry process. In some embodiments, only selected or some images or frames from the video are sent (e.g., every so often, or at pre-defined time-intervals, or at random time-intervals, or when one or more conditions hold true). In some embodiments, the end-user device may optionally aggregate and then encode in a video frame (or in some video frames) some or all of the accelerometer data that occurred or that was sensed or measured, from the last video frame that was actually sent to the remote server, until the current frame that is about to be sent to the remote server, into the current frame that is about to be sent to the remote server; such that the currently-sent frame may include, encoded therein, a digital representation of accelerometer data that spans a time-period of several seconds, in some situations.

In some embodiments, optionally, based on a random digital key or based on other random or pseudo-random parameter or criteria, the system may utilize and/or encode, for example, a match (or a mismatch) between: (i) one or more selected user inputs (e.g., specific numbers or digits or characters that the user types), and (ii) one or more direct modulations of the camera of the electronic device, such as, changing the zoom (zoom in, zoom out), changing the lens focus, rotating the screen (or rotating the entirety of the electronic device), flashing the camera (e.g., causing the camera to light its flash or to activate its illumination unit) on and off (e.g., optionally in accordance with a particular pre-defined pattern), or the like. These changes and/or similar modifications may be initiated by the end-user device, and may be sustained (e.g., for several seconds) or may be temporary (e.g., may be performed one single time during the user interaction; or may be performed a particular number of times during the user interactions). These changes are encoded in the camera recording, and therefore they can be used by the system of the present invention to decode the original inputs that were actually made by the user. In a demonstrative example, user Carl is entering data into his smartphone to command a wire transfer; the process takes him 60 seconds; during this data entry process, a video is captured by the smartphone, at a frame capture rate of 30

FPS; at the 17th second of the process, the application causes the smartphone to activate its "flash" (its illumination unit) for exactly 1.5 seconds; this causes, or should cause, a set of 45 frames (or approximately 45 frames) to appear brighter or much brighter relative to the other frames, due to the illumination effect that was injected during the data entry process. The remote server may then verify or check, whether the particular frames of the video (or some of them) indeed reflect such injected event of added illumination, as a condition for approving or rejecting the submitted transaction.

In some embodiments, optionally, based on a random digital key or other random or pseudo-random parameter or criteria, some embodiments may utilize a match (or a mismatch) between: (i) one or more selected user inputs (e.g., specific numbers or digits or characters that the user types), and (ii) one or more indirect modulations of the camera of the end-user device; such as, vibrating or causing a vibration of the phone (or other end-user device that is utilized by the user), optionally in accordance with a particular vibration pattern, such that the recorded image or the recorded video is vibrated as well or reflects such induced spatial vibration. These changes are encoded in the camera recording, and therefore they can be used to decode the original inputs by the user. In a demonstrative example, user David is entering data into his smartphone to command a wire transfer; the process takes him 40 seconds; during this data entry process, a video is captured by the smartphone, at a frame capture rate of 30 FPS; at the 24th second of the process, the application causes the smartphone to activate its vibration unit for exactly two seconds; this causes, or should cause, a set of 60 frames (or approximately 60 frames) to appear fuzzy or out-of-focus, or to visibly show a displacement of objects or a displacement of the field-of-view by at least a few pixels (e.g., a head-shot of the user should be shown at a slight displacement of a few pixels to the right, then to the left, then to the right, and so forth, due to the vibration of the device and its camera). The remote server may then verify or check, whether the particular frames of the video (or some of them) indeed reflect such injected event of added vibrations, as a condition for approving or rejecting the submitted transaction.

In some embodiments, optionally, based on a random digital key or other random or pseudo-random parameter or criteria, the system may utilize a match (or a mismatch) between: (i) one or more selected user inputs (e.g., specific numbers or digits or characters that the user types), and (ii) the audio playing of one or more specific sounds or audio-clips or audible output or beeps or noises or other audio output from the speaker(s) of the electronic device of the user. The sound and video recordings can then be cross-referenced to ensure validity. In a demonstrative example, user Albert is entering data into his smartphone to command a wire transfer; the process takes him 45 seconds; during this data entry process, an audio-and-video clip is captured by the smartphone; at the 26th second of the process, the application causes the smartphone to generate a particular sound (e.g., a pre-recorded sound, a beep, an utterance a particular word or phrase, or the like) having a particular time-length (e.g., one second); this causes, or should cause, a one-second segment of the captured audio to include the pre-defined audio that was generated. The remote server may then verify or check, whether the particular portions of the captured audio (or, of the captured video-and-audio) indeed reflect such injected event of added background audio, as a condition for approving or rejecting the submitted transaction.

In some embodiments, optionally, the end-user device may be configured by the system to actively present to the user one or more requirements or challenges, such as, a requirement a to speak or to utter or to say specific part(s) of the transaction details while also recording a video of the user. This speech or audio stream is recorded by the end-user device. The sound and video recordings can then be cross referenced to ensure validity. In a demonstrative example, user Richard is entering data into his smartphone to command a wire transfer; the process takes him 50 seconds; during this data entry process, an audio-and-video clip is captured by the smartphone; at the 27th second of the process, the application causes the smartphone to display an on-screen message of "Please say now the word Passport", and/or to playback an audio clip that says "Please say now the word Passport"; wherein the particular word ("Passport") is selected randomly from a pool of pre-defined words or phrases; this on-screen message or audio message should cause user Richard to say the word "Passport" in the next few seconds that followed that message. The remote server may then verify or check, whether the particular portions of the captured audio (or, of the captured video-and-audio) indeed reflect such word(s) spoken by the user (optionally, utilizing a speech-to-text converter or an Automatic Speech Recognition (ASR) unit to convert the captured audio into a string of characters or into word(s) for matching purposes), as a condition for approving or rejecting the submitted transaction In some embodiments, optionally, the end-user device may record its own audio speaker(s) while they are playing specific parts of the user input details (e.g., the amount of money that the user requests to transfer), while also recording a video of the user. The speaker sounds or the audio output, optionally, can be uniquely modulated or modified or distorted in a particular manner, configured or programmed by the application or by the system, for each application or implementation, or even for each application session or usage-session or log-in session or transaction; for example, causing the end-user device to distort the audio playback in one manner for transaction 1 of user Adam; then, after one hour, distort the audio playback in a different manner for transaction 2 of user Adam, or for another transaction of user Bob). The sound and video recordings can then be cross-referenced to ensure validity. For example, the existence or the lack of a matching audio distortion in the captured audio (or, in the captured video-and-audio) may be used by the remote server to approve or reject the submitted transaction.

In some embodiments, optionally, the end-user device may present the application details or data or text or images or other content on the screen of the end-user device, in a unique way or in a modified way, and the camera of the end-user device may record a video of the user as he reads the content and/or interacts with it; and this may be used for transaction verification, or for rejecting or approving a submitted transaction. For example, user Carl is utilizing his tablet to enter data for a wire transfer, in a process that takes him 50 seconds; a video is being captured during this process via the front-side camera of the tablet; during this process, at the 18th second of the process, a content item (e.g., a text portion, or a GUI element) on the screen of the tablet is actively moved or displaced by the application, from the top part of the screen to the bottom of the screen and then again to the top of the screen, in an on-screen movement scheme that takes (for example) three seconds; one or more eye tracking techniques or image analysis or video analysis or computer vision techniques may be used (e.g., optionally utilizing Machine Learning (ML), or other suitable computer vision method) in order to follow and track the eyes of the user in the video recording, and to thereby verify that the user is directly engaging with the displayed material; for example, by detecting that the video captured by the end-user device, indeed depicts the face of a user in which the eyes of the user are shown gazing upwardly and then moving the gaze downwardly and then moving the gaze upwardly, in said example). For example, if the captured video does not show a change in the gazing direction of the user, or in the spatial face positioning of the user, from the 18th second of the video until the 21st second of the video, then the remote server may reject or block the transaction, since the captured video does not reflect the expected change(s) in its content that should have been triggered by the on-screen movement of the content-item or the GUI element during that time-period within the data entry process.

In some embodiments, optionally, the end-user device may present a physical challenge to the user, which may then be utilized for authentication or verification purposes; for example, requesting the user to raise his hand, or to make a V symbol with his fingers, or to do a "thumb up" or a "thumb down" gesture with his fingers. Such physical challenges or physical requirements or tasks may be triggered or initiated based on specific inputs of the user, or may be initiated randomly or pseudo-randomly, or if a particular type of transaction or transaction-data is entered (e.g., only for wire transfers, or only for wire transfers greater than 500 dollars to a new recipient). The manner in which the user performs the physical challenge is recorded by the camera of the end-user device which is recording the video of the user; and computer vision or image recognition methods may then be applied to the recorded video, to authenticate that the transaction was indeed authorized by the user, and/or to ensure liveness, and/or to block or detect a replay attack, or for other security-related purposes.

Some embodiments may optionally utilize augmented reality (AR) to generate and/or to present one or more virtual challenges or AR-based challenges to the user, which are then utilized for authentication or verification purposes. For example, the end-user device may require the user to touch a specific point in space; and such AR-based requirement or task may be triggered or initiated based on specific inputs of the user, or may be initiated randomly or pseudo-randomly, or if a particular type of transaction or transaction-data is entered. The manner in which the user performs the requested challenge is recorded by the camera (and/or by other sensors) of the end-user device, and image recognition or computer vision may then be applied to the video recording to authenticate that the transaction was indeed authorized by the user. In some embodiments, the AR-based task or challenge may be implemented using a dedicated AR-based device or unit (e.g., an AR-based helmet or glasses or head-gear or wearable device or other gear); however, in other embodiments, the AR-based task or challenge need not use any such additional or dedicated device, but rather, may be presented to the user via his regular end-user device (e.g., laptop computer, desktop computer, smartphone, tablet), such as by providing textual instructions and/or graphical instructions and/or audible instructions with regard to the required AR-based task, and then capturing and/or streaming video (e.g., recorded video that is captured locally and then uploaded, or a live video feed that is uploaded as a real-time streaming video) via the camera of the end-user device, as such camera can capture video which is then analyzed to determine whether it reflects user gestures that correspond to the AR-based task or challenge that was required from the user to perform.

Some embodiments may optionally use augmented reality (AR) to present the user with a means of inputting information to the application, through an augmented reality (AR) interface of other AR-based elements or components. For example, some embodiments may generate or present an AR-based keyboard or keypad or other AR-based input mechanism, which may be displayed in space and may allow the user to "type" or to tap virtually on such AR-based keyboard or input-unit, by performing spatial gestures in mid-air or on a planar object (e.g., a table), in order to enter information into the application. The challenge is recorded by the camera of the end-user device, and the video recording can then be used to authenticate that the transaction was indeed authorized by the user.

Some embodiments may operate to detect when a face (e.g., a human face) is present in the video frame that was captured by the camera of the end-user device, using image recognition or computer vision techniques. For example, if the face (e.g., any human face; or a particular human face of a particular human user) is not present (e.g., is not detected, or is not recognized) in one or more video frame(s) for a pre-defined period of time (e.g., for at least N seconds), then the end-user device may generate or provide to the user a warning (e.g., text-based warning, visual warning, audible warning) that the user should place his face within the field-of-view of the video that is being captured. This may enable the system to ensure that biometric information is available throughout the recorded session. In some embodiments, a lack of detection of a human face, for a pre-defined number of captured video frames (e.g., in at least M out of the N frames that were captured during the data entry process), and/or for a particular time-length (e.g., for at least T1 consecutive seconds; or for at least T2 non-consecutive seconds in the aggregate), may trigger the system to reject or block a submitted transaction.

In some embodiments, liveliness and/or freshness may be ensured or verified through one or more techniques that may be employed separately or in consort or in the aggregate. These techniques may include, for example, the following or other suitable methods.

In a first example for ensuring liveness and freshness, the end-user device may be configured to generate and display a box or a window or an on-screen content-item, inside or within the video frame, that moves around in accordance with a pattern defined by a random digital key or in accordance with a pre-defined movement pattern (e.g., which may optionally be selected randomly from a pool of multiple such pre-defined movement patterns). The user is thus required to keep his face inside the on-screen frame for a particular (e.g., substantial) period of time of the session or for at least a certain percentage of the session. This ensures that the user is actively engaged with the end-user device and with the application screen. Optionally, computer vision techniques or image recognition techniques may be used to ensure that the user's face indeed appears in the relevant video frame(s) that were captured, and/or that the eye gaze of the user is directed towards a relevant direction based on the movement that occurs to particular content item(s) on the screen; and such detected matches or mismatches may be used by the system to reject or approve a transaction.

In a second example for ensuring liveness and freshness, some embodiments may perform post-processing or real-time processing for screen detection, to ensure that a malicious actor or an attacker did not try to spoof the user's identify by maliciously utilizing a digital image or a digital video of the legitimate user that the attacker is playing or displaying on a computer screen or on a screen of other electronic device of the attacker. For example, a transaction is entered via a smartphone that is alleged to be the smartphone of user Adam that is operated by user Adam; the application requires the user to look into the front-side camera; a preliminary computer vision analysis of the video that was captured, shows that indeed there is a human face present in the captured video; a secondary analysis shows that the human face is indeed a match to a pre-stored image of the legitimate user (Adam), and that it appears to be live (e.g., the captured video shows a moving face of a human); however, a further computer vision analysis of the captured video, may reveal that the captured video also shows a thin black frame of an iPad or other tablet, surrounding the human face, thereby enabling the system to determine that this is actually an attacker or an impostor who had placed in front of the end-user device another electronic device (e.g., an iPad or another tablet) which plays a video of the face of the genuine user; and this may trigger the system to reject or block the submitted transaction.

In a third example for ensuring liveness and freshness, some embodiments may perform post-processing or real-time processing for paper detection, to ensure that a malicious actor or an attacker did not try to spoof the user's identify with a printed image of the user, such as, maliciously displaying to the end-user device a color printed image of the legitimate user. For example, a computer vision process may analyze the captured video, in order to specifically look for (and detect) paper imperfections, paper folds, paper wrinkles, paper shading, a two-dimensional or "flat" appearance of the image or face that is associated with a paper image and not with a three-dimensional head or object, or other paper revealing features that may thus be utilized for blocking or rejecting the submitted transaction.

In another example, some embodiments may perform post-processing or real-time processing for deep-fake detection, to ensure that a malicious actor or attacker did not try to spoof the user's identify by generating a deep fake video image of the user using generative machine learning technology. For example, a deep-fake detection unit may search for, and may detect, imperfect transitions between: (i) frame-portions that are attributed to a first source (e.g., a photo or a video of the genuine user), and (ii) frame-portions that were added or modified by an attacker who created a deep-fake image or video; based on imperfect or abrupt "stitch lines" between image portions, or non-smooth or non-gradual transitions between two neighboring image-portions or frame-regions; or other techniques for detecting a deep fake image or video, which may then trigger a determination to block or reject a submitted transaction.

In yet another example, some embodiments may perform or may introduce one or more real-time liveness or freshness challenges, in order to demonstrate active or "live" or "fresh" or current engagement of a human user with the application, and/or in order to detect various types of replay attacks or other spoofing attacks. Such challenges or tasks may be or may include, for example, a generating or displaying a message requiring the end-user to perform a particular gesture with his face and/or head and/or hand(s) (e.g., "please look to your right, and then look to your left"; or "please raise your right hand and make the letter V with your fingers"; or "please move your head to look down towards the ground and then look back up towards the camera"; or other suitable tasks or challenges, which may be pre-defined in a pool or bank or database of such tasks or challenges; and which may be selected from such database randomly or pseudo-randomly, or based on task selection rules or challenge selection rules that take into account the type of transaction that is being submitted, the monetary amount involved, and/or other parameters or data).

For demonstrative purposes, some portions of the discussion above were in the context of performing or submitting a financial transaction or a banking transaction or a monetary transaction; however, these were only non-limiting examples, and embodiments of the present invention may be utilized in conjunction with a variety of other types of operations, transactions, and systems; and some embodiments may be agnostic to the type of transaction being performed or to the context of the transaction. For example, some embodiments of the present invention may be utilized for, or in conjunction with: performing a transaction in a securities account or a brokerage account; performing a transaction in crypto-currency or digital currency; composing and/or sending an electronic mail (email) message or other type of electronic or digital message in a manner that verifies the sender and/or the message; inputting and/or sending confidential information or confidential data; inputting and/or sending medical data, by a patient and/or by a physician and/or by a pharmacy and/or by a health practitioner or other entity; inputting and/or sending a medical prescription or a medical record by a physician or health practitioner; entering of data into an online form, or into a multi-part form or a multi-page form, or into a set of forms, or into a set of on-screen fields; modification of existing data (e.g., changing of account information or user information); entering or creating or adding a signature onto a form or a document (e.g., into or onto a PDF document); typing and/or sending of messages, Instant Messaging (IM) items or messages, chat messages, real-time messages, email messages, or other messages or interactions; inputting and/or sending a legal document or a legally-operative data-item or document (e.g., an attorney or a notary public submitting or sending a verified signature on an affidavit or a sworn statement); transmission of insurance-related information or data; authoring and/or transmission of data or a data-item that is intended to be entered into a blockchain data-set or a blockchain data structure; and/or various other types of data entry, data composing or authoring, data submission, data transmission, transmission of messages and/or data-items, and/or the processing of such data-items in a manner that requires to authenticate the sender and/or to verify the transaction or its data.

For demonstrative purposes, some portions of the discussion may refer to operations of user authentication and/or transaction verification as performed on (or by, or via) a remote server or an external server; however, these are only non-limiting examples; some, or all, of such operations may be performed, in some implementations, exclusively in or by the end-user device itself, or via a collaboration between the end-user device and the remote server, or via other suitable scheme that distributes the processing operations among two or more devices or units, which may be local and/or remote.

In some embodiments, video is recorded and captured by the end-user device, while the user is entering data and/or performing a transaction; and different implementations may determine differently whether, or how, to display to the end-user the video that is being captured. In a first implementation, the video feed that is being captured by an imager or a camera of the end-user device (e.g., by a front-side camera of a smartphone or a tablet), is also displayed or shown in real time on the screen of the end-user device, such as, as a small rectangle (e.g., occupying between 10 percent to 50 percent of the screen size) that is located at a corner of the screen. In a second implementation, the video feed that is captured is not shown at all to the end-user on the end-user device; and the system may operate entirely without ever showing to the end-user the actual or the real time video feed that was captured. In a third implementation, the video feed is shown to the user only for a partial period of time, such as, during the first three seconds of commencing to capture the video feed, in order to ensure that the end-user understands that he is being imaged, and then the on-screen display of the video feed is turned off or is removed or concealed (e.g., in order to allow the user to engage with the full on-screen UI or GUI). In a fourth implementation, the screen or the display unit of the end-user device, may show a modified version or a manipulated version or an altered version of the video feed that is actually being imaged and captured; for example, a cropped version which keeps only the imaged face of the user and crops-out most of the background behind him, or a blurred or partially-blurred version of the captured video feed (e.g., keeping the human face area non-blurred, while blurring some or all of the background image portions). In a fifth implementation, the screen or display unit of the end-users device, may show an animated avatar or a virtual representation of the user or of his face, or an animated cartoon representation thereof, or a personalized Emoji character (e.g., similar to Bitmoji characters or avatars), or the like; which may optionally be animated randomly, or which may optionally be animated in accordance with the actual video being captured and/or in accordance with the actual audio being captured (e.g., the video capture indicates that the user is yawning, and the on-screen avatar is animated to be yawning).

Some embodiments may optionally utilize a passive challenge to confirm (or detect, or estimate) liveness of the end-user; in which the liveness of the user is tested in a passive manner which is transparent and/or unknown to the user, wherein the user is not aware that the system is testing or estimating the liveness property. For example, the user is utilizing his electronic device to enter and submit transaction data; the front-side camera of the electronic device is operational, to capture the video of the user; a live feed of the acquired video is displayed in real time at a rectangular picture-in-picture on the screen of the electronic device; then, the application on the end-user device may intentionally cause a zoom-in, or a zoom-out, or other zoom-related modifications, or other shifting of moving or modifications or an expansion or a shrinkage of the field-of-view of the camera of the electronic device, thereby causing the face of the end-user to be partially (or even entirely) out of the modified or zoomed field-of-view of the camera, or thereby causing the face of the user to not appear (entirely, or at least partially) in the live video feed being captured and displayed in real time; the legitimate human user who actually operates the end-user device (e.g., and not a remote attacker or a malware, and not an attacker performing a spoofing attack via a paper image or via a digital image or via a digital video or via a deep-fake image or a deep-fake video of the legitimate user) is expected to notice that his face is not (entirely, or partially) within the displayed feed, and is expected to move or shift the position or location of his body or of his head or of the electronic device in order to adequately show his face within the captured video feed; thereby inducing the legitimate user to perform such real-world modifications that correct the on-screen anomaly, and thus enabling the system to determine liveness of the current end-user. In contrast, lack of corrective actions in response to such a challenge, may cause the system to estimate that the current user is an attacker or a malware that lacks liveness. Other types of challenges may be used for liveness detection or verification.

Some embodiments may perform on-device (or in-device) data fusion or data entanglement, for privatization purposes and/or for other purposes. For example, the system may collect biometric data and action signals (e.g., transaction data that is entered by the user via his electronic device), and then fuses or merges this data into a single unified channel of data on the end-user device itself; for example, by passing the data through a non-reversible entanglement transformation or fusion transformation or hash function or hashing formula. This results in entangled data or fused data, such that an attempt to attack or manipulate the biometric data therein, would fundamentally corrupt the action data or the transaction data, and vice versa. Furthermore, the data entanglement process may also eliminate any human-identifiable biometric signatures from the unified data that is utilized for user authentication and transaction verification.

Some embodiments may utilize one or more ways or units, in order to combine or fuse together biometric data with transaction data. In addition to, or instead of, the ways and the units described above, one or more of the following method(s), may be used: (a) Using the microphone of the end-user device to listen to (or to monitor) the ambient audio while the user is entering transaction data, thereby capturing and detecting audio that indicates the existence of keyboard clicking and/or finger(s) clicking and tapping sounds, thus ensuring that a physical input was indeed present based on the audio sounds that it emitted, and ensuring that physical taps and keystrokes have indeed triggered a digital response on the end-user device (e.g., in contrast with a malware or a remote attacker). (b) Monitoring and recording of mouse movements and clicks and gestures, and/or gestures or interactions with a touch-pad or other physical input unit or tactile input unit of the electronic device; and adding such monitored data into the unified data channel that represents both biometric data and transaction data. (c) Utilization of Augmented Reality (AR) methods, to request the end-user to perform a task or to enter a code or a secret that the user knows; for example, to perform a particular pre-defined hand motion or hand gesture that was set in advance for this user, or performing spatial touching of (or, spatial gesturing or pointing towards or at) particular AR-based elements that are projected or otherwise viewable via an AR environment or an AR device (e.g., AR helmet or gear or glasses or other equipment), or performing other AR-based task or challenge which requires the end-user to perform certain spatial gestures which are imaged by the camera(s) of his end-user device and their existence and correctness are analyzed and verified based on a captured video or from an uploaded streaming video. (d) Utilization of interactive means for verifying a transaction, by requiring the user to perform a particular gesture or spatial gesture (e.g., randomly or pseudo-randomly selected from a pool or a bank of pre-defined gestures), for example, requiring the user to move his face or to nod his head or to blink with his eyes or to move his hands or fingers, as a way of confirming liveness and/or in order to indicate the user's approval to confirm a transaction.

Embodiments of the present invention may thus operate to combine or merge or fuse together, (i) biometric data (or user interaction data) and (ii) transaction data or action data, into a unified data-item or a unified vector or channel of information; optionally utilizing or applying a privatization method or a fusion or hashing or data transformation method to facilitate this process. Embodiments of the present invention may both concurrently (i) authenticate the identity of the user, and (ii) validate or verify the submitted transaction, as (or using) a single unified verification step. Some embodiments may further provide continuous or substantially continuous authentication and verification of a transaction and the biometric data associated with it, throughout the course or the path of a transaction, and not just at an ending time-point at which the transaction data is submitted for processing.

Reference is made to FIG. 1, which is a schematic block-diagram illustration of a system 100, in accordance with some embodiments of the present invention. System 100 may be implemented using a suitable combination of hardware components and/or software components.

For example, an Electronic Device 110 may be utilized by an end-user in order to interact with a computerized service, typically implemented as via a remote Server 150 (e.g., a dedicated server, a "cloud computing" server, an application server, a Web server, or the like). Electronic Device 110 may be, for example, a laptop computer, a desktop computer, a smartphone, a tablet, a smart-watch, a smart television, or the like. Electronic Device 110 may communicate with Server 150 via one or more wired and/or wireless communication links and/or networks; for example, over the Internet, via an Internet connection, via an Internet Protocol (IP) connection, via a TCP/IP connection, via HTTP or HTTPS communication, via Wi-Fi communication, via cellular communication (e.g., via 5G or 4G LTE or 4G or 3G or 2G cellular communication), or the like.

Electronic Device 110 may comprise, for example: a processor 111 able to execute code; a memory unit 112 (e.g., Random Access Memory (RAM) unit, Flash memory, volatile memory) able to store data short-term; a storage unit 113 (e.g., Hard Disk Drive (HDD), Solid State Drive (SSD), optical drive, Flash memory, non-volatile memory) able to store data long-term; a display unit 114 (e.g., a touch screen, or non-touch screen, or other display unit or monitor); one or more input units 115 (e.g., keyboard, physical keyboard, on-screen keyboard, touch-pad, touch-screen); a microphone 116 able to capture audio; a camera 117 or imager(s) (e.g., front-side camera, front-facing camera, rear-side camera, rear-facing camera) able to capture video and/or images; and/or other suitable components. Electronic Device 110 may further include, for example, a power source (e.g., battery, power cell, rechargeable battery) able to provide electric power to other components of Electronic Device 110; an Operating System (OS) with drivers and applications or "apps"; optionally, one or more accelerometers, one or more gyroscopes, one or more compass units, one or more spatial orientation sensors; and/or other components.

Electronic Device 110 may comprise a Client-Side Application 131, which enables the end-user to perform or to submit or to request a transaction, typically being in communication over wired and/or wireless communication link(s) with Remote Server 150. For example, Remote Server 150 may comprise a Server-Side Application 155 (e.g., a server-side banking application or online commerce application), which may include or may be associated with a User Authentication Unit 151 and a Transaction Verification Unit 152; and in some embodiments, they may be implemented as a Unified User-and-Transaction Validation Unit 153 as it may concurrently authenticate the user and verify transaction at the same time and based on the same unified channel of data which fuses together biometric data and transaction data.

The Server-Side Application 155 may perform any of the functionalities that are discussed above and/or herein with regard to server-side operations, by itself and/or by being operably associated with one or more server-side components and/or by being operably associated with one or more client-side components (which may optionally perform some of the operations or functionalities described above and/or herein). Similarly, the Client-Side Application 131 may perform any of the functionalities that are discussed above and/or herein with regard to client-side operations, by itself and/or by being operably associated with one or more client-side components and/or by being operably associated with one or more server-side components (which may optionally perform some of the operations or functionalities described above and/or herein). It is noted that FIG. 1 shows, for demonstrative purposes, some components as being located on the server side, and shows some other components as being located on the client side; however, this is only a non-limiting example; some embodiments may implement on the client side one or more of the components that are shown as located on the server side; some embodiments may implement on the server side one or more of the components that are shown as located on the client side; some embodiments may implement a particular component, or some component, by utilizing both a server-side unit and a client-side unit; or by using other suitable architectures. In some embodiments, raw data and/or partially-processed data and/or fully-processed data, as well as sensed data and/or measured data and/or collected data and/or newly-generated data, may be exchanged (e.g., over a secure communication link) between client-side unit(s) and server-side unit(s), or between the end-user device and the remote server, or between or among components that are located on the same side of the communication channel.

Optionally, biometric representation of a user may be created or generated actively via the Active Registration Unit 121; or, biometric representation of the user may be created or generated passively via the Passive Registration Unit 122. A Mismatch/Anomaly Detector Unit 157 may operate to detect an anomaly or a mismatch or discrepancy or corrupted data or manipulated data, in the unified data channel that comprises transaction data and biometrics data. A Fraud Estimation/Detection Unit 158 may detect or estimate or determine that the transaction is fraudulent and/or that the user is not the genuine legitimate user or that the unified data channel has been corrupted or manipulated or tampered with, based on the mismatch or anomaly detected, and/or based on other parameters involved or conditions checked, e.g., taking into account the type of transaction that was requested, such as a retail purchase or a wire transfer; taking into account the monetary amount or the monetary value of the transaction; taking into account one or more risk factors or fraud-related indicators that are pre-defined or that are detected (e.g., the transaction is performed from a new computing device that was never used before by this user or by this account owner, or from a geographic location or from an Internet Protocol (IP) address that was never used before by this user or by this account owner, or the like).

Fraud Detection and Prevention Unit 158 may perform one or more operations of fraud detection or fraud estimation or fraud determination, based on the anomalies or discrepancy or fraud-related signals that the system may be able to produce or generate. If it is estimated or determined that a fraudulent transaction is submitted, optionally with a fraud certainty level that is greater than a pre-defined threshold value, then Fraud Mitigation Unit 159 may trigger or may perform one or more fraud mitigation operations or fraud reduction operations; for example, by blocking or rejecting or freezing the submitted transaction or the associated account, by requiring the user to perform additional authentication operations via additional authentication device(s) or route(s) (e.g., two-factor authentication), by requiring the user to contact a customer service representative by phone or in person, by requiring the user to answer security questions, or the like.

Some embodiments of the present invention may include methods and systems for user authentication and/or transaction verification, or for a single-step validation or unified validation of user-and-transaction, or for fraud detection and fraud mitigation. For example, a computerized method may include: (a) monitoring interactions of a user who interacts with an electronic device to enter transaction data, and extracting one or more biometric traits of the user; (b) generating a unified data-item, that represents a unified fusion of both (i) the transaction data, and (ii) biometric data reflecting the one or more biometric traits of the user that were extracted from interactions of the user during entry of transaction data. The monitoring of user interactions may be performed by a User Interactions Monitoring Unit 132, which may monitor and/or log and/or track and/or record user interactions that are performed by the user. Optionally, a Biometrics Sensor/Collector Unit 133 may operate to collect and/or to generate biometric data, based on data or readings or measurements that are sensed or measured by one or more input units of the end-user device and/or by one or more sensors of the end-user device. Transaction Data Collector Unit 134 operates to collect the transaction data that is being entered or submitted, or that was entered and/or submitted, by the user. Unified Transaction-and-Biometrics Data-Item Generator 135 operates to fuse together, or merge, or otherwise unify, the biometrics data and the transaction data, or to embed or conceal one of them into the other, or to otherwise generate entanglement of the transaction data with the biometrics data. The unified transaction-and-biometrics data-item (or record) may then be transferred or transmitted to the remote server, via a secure communication channel, and may be processed there by the Unified User-and-Transaction Validation Unit 153.

In some embodiments, the transaction data within the unified data-item that is generated in step (b), cannot be modified or corrupted without also causing modification or corruption of the biometric data within the unified data-item; and similarly, the biometric data within the unified data-item that is generated in step (b), cannot be modified or corrupted without also causing modification or corruption of the transaction data within the unified data-item;

In some embodiments, modification or corruption of the transaction data within the unified data-item, automatically causes modification or corruption of the biometric data within the unified data-item; and similarly, modification or corruption of the biometric data within the unified data-item, automatically causes modification or corruption of the biometric data within the unified data-item.

In some embodiments, the method comprises: (A) during entry of transaction data by said user via the electronic device, activating a video camera of said electronic device and capturing a video feed of said user; (B) embedding at least part of the transaction data as digital data that is added into and is concealed within one or more video frames of said video feed; (C) authenticating said user and the submitted transaction, based on said video feed that includes therein the transaction data concealed within one or more video frames thereof.

In some embodiments, selective activation and/or deactivation of the video camera, and/or of other components of the end-user device that are discussed above and/or herein (e.g., the illumination unit or the "flash" illumination unit; the vibration unit, or other tactile feedback unit; the microphone; or the like) may be performed by a Selective Activation & Deactivation Unit 136; and such selective activation or deactivation may optionally be performed based on one or more commands or signals or triggers, which may be generated locally in the end-user device (e.g., the client-side application 131 may trigger a selective activation of the front-facing video camera, since the user is requesting to commence data entry for a wire transfer to a new payee), and/or which may be received from the remote server (e.g., the remote server 150 may send a command to the end-user device, requiring to activate the front-facing video camera of the end-user device, since it detects that the end-user device is connected to the remote server via a new IP address that was not seen before for this user). Other criteria or conditions may be used.

In some embodiments, the embedding operations or the concealing operations may be performed locally within the end-user device via an Data Embedding/Concealment Unit 137, which may utilize one or more steganography techniques, encoding, cryptographic algorithms, data fusion algorithms, data hashing algorithms, or other suitable methods.

In some embodiments, the method comprises: (A) during entry of transaction data by said user via the electronic device, activating a video camera of said electronic device and capturing a video feed of said user; (B) during the capturing of the video feed of the user during entry of the transaction data, causing said electronic device to vibrate (e.g., by activating its vibration unit, or other tactile feedback unit) at a particular time-point and in accordance with a pre-defined vibration scheme; (C) performing an analysis of captured video that was captured by the camera of the electronic device during entry of data of said transaction, to detect whether or not a content of the captured video reflects said pre-defined vibration scheme at said particular time-point.

In some embodiments, for example, a Computer Vision Analysis Unit 188 may receive the video from the end-user device, over a secure communication channel; and may perform analysis of the video in order to determine whether the content of the video indeed reflects the vibration(s) at the relevant time-points or time-slots (e.g., a rapid displacement of the content of a frame, sideways or right-and-left or up-and-down, generally in accordance with the vibration pattern or the vibration scheme that was introduced on the end-user device).

In some embodiments, the method comprises: (A) during entry of transaction data by said user via the electronic device, activating a microphone of said electronic device and capturing an audio feed; (B) during a capture of audio during entry of the transaction data, causing said electronic device to emit a particular audible sound at a particular time-point; (C) performing an analysis of captured audio that was captured by the microphone of the electronic device during entry of data of said transaction, to detect whether or not a content of the captured audio reflects said particular audible sound at said particular time-point.

In some embodiments, for example, an Audio Analysis Unit 189 may receive the audio from the end-user device, over a secure communication channel; and may perform analysis of the audio in order to determine whether the content of the audio indeed reflects the particular audible sounds that were introduced by the end-user device at the relevant time-points.

In some embodiments, the method comprises: (A) during entry of transaction data by said user via the electronic device, activating a video camera of said electronic device and capturing a video feed of said user; (B) during the capturing of the video feed of the user during entry of the transaction data, causing at a particular time-point a particular displacement of an on-screen element within a screen of the electronic device, wherein said displacement of the on-screen element is intended to induce a particular change in a staring direction or a gazing direction of the user (e.g., by an On-Screen Element Displacement Unit 138, which may displace or move an on-screen element, or which may animate an on-screen element in a manner that is expected to attract attention or staring or gazing by the end-user; or which may add or modify visual attributes to an on-screen element, such as, by repeatedly changing its color or its brightness level or its size); and then (C) performing an analysis of captured video that was captured by the camera of the electronic device during entry of data of said transaction, to detect whether or not a content of the captured video reflects at said particular time-point said particular change in the staring direction or the gazing direction.

In some embodiments, the method comprises: (A) during entry of transaction data by said user via the electronic device, activating a video camera of said electronic device and capturing a video feed of said user; (B) during the capturing of the video feed of the user during entry of the transaction data, causing a zoom-related operation of the camera to change the field-of-view of the camera that is captured in said video field (e.g., performed by a Field-of-View Modification Unit 139), and thus causing a face of the user to be at least partially outside of the field-of-view of the camera; (C) performing an analysis of captured video that was captured by the camera of the electronic device during entry of data of said transaction, to detect whether or not a content of the captured video reflects a corrective physical action that said user performed to bring his face fully into the field-of-view of the camera of the electronic device.

In some embodiments, the method comprises: (A) during entry of transaction data by said user via the electronic device, activating a video camera of said electronic device and capturing a video feed of said user; (B) during the capturing of the video feed of the user during entry of the transaction data, generating a notification requiring the user to perform a particular spatial gesture with a particular body part of the user; (C) performing an analysis of captured video that was captured by the camera of the electronic device during entry of data of said transaction, to detect whether or not a content of the captured video reflects the particular spatial gesture of the particular body part. The client-side operations may be performed via a Spatial Gesture(s) Requestor Unit 141, which may select or generate the request to perform the particular spatial gesture. The server-side operations may be performed via the Computer Vision Analysis Unit 188, or by a Spatial Gesture Recognizer Unit 161 or other component(s).

In some embodiments, the method comprises: (A) during entry of transaction data by said user via the electronic device, activating an Augmented Reality (AR) component that is associated with the electronic device; (B) generating a notification requiring the user to perform a particular spatial gesture to interact with a particular AR-based element that is displayed to the user via said AR component; (C) performing an analysis of captured video that was captured by a camera of the electronic device during entry of data of said transaction, to detect whether or not a content of the captured video reflects said particular spatial gesture. The client-side operations may be performed via an AR-Based Requestor Unit 142, which may select or generate the request to perform the AR-based gesture(s) or task(s). The server-side operations may be performed via the Computer Vision Analysis Unit 188, or by an AR-Based Task Recognizer Unit 162 or other component(s).

In some embodiments, the method comprises: (A) during entry of transaction data by said user via the electronic device, activating a video camera of said electronic device and capturing a video feed of said user; (B) during the capturing of the video feed of the user during entry of the transaction data, causing an illumination unit of said electronic device to illuminate at a particular time-point and in accordance with a pre-defined illumination scheme; (C) performing an analysis of captured video that was captured by the camera of the electronic device during entry of data of said transaction, via the Computer Vision Analysis Unit 161, to detect whether or not a content of the captured video reflects said pre-defined illumination scheme at said particular time-point.

In some embodiments, the method comprises: (A) during entry of transaction data by said user via the electronic device, activating a microphone of said electronic device and capturing an audio feed; (B) performing an analysis of captured audio that was captured by the microphone of the electronic device during entry of data of said transaction, via the Audio Analysis Unit 189, to detect whether or not said captured audio reflects sounds of physical keystrokes and sounds of physical taps that match data entry of the transaction data that was submitted via said electronic device.

In some embodiments, step (b) that was mentioned above may comprise: embedding and concealing said transaction data, into one or more video frames of a video that is captured by the electronic device during entry of transaction data. This may be performed by the Data Embedding/Concealment Unit 137. The embedded data or the concealed data may then be extracted and processed on the server side for user authentication and transaction verification, by a Concealed Data Extractor & Analyzer Unit 163.

In some embodiments, step (b) that was mentioned above may comprise: generating the unified data-item by performing digital hashing, in accordance with a pre-defined digital hash function, of said transaction data and said biometric data; or by performing other suitable process of unidirectional privatization of the data, or a process of privatization transformation of the data, which passes the data through a one-way transformation that is non-reversible; wherein the original (pre-transformation) data cannot be reversed or obtained from the post-transformation data; wherein the post-transformation data is sufficient for the purposes of biometric analysis and/or user authentication and/or transaction verification.

In some embodiments, step (b) that was mentioned above may comprise: performing continuous real-time authentication of the user during entry of transaction data, and concurrently performing real-time verification of the transaction data; wherein said performing is a single step process of concurrent user authentication and transaction verification; wherein said single step process lacks a time-gap between user authentication at log-in and transaction verification at transaction submission.

In some embodiments, step (b) that was mentioned above may comprise: embedding and concealing, into one or more video frames of a video that is captured by the electronic device during entry of transaction data, at least one of: (I) a name of a recipient or a beneficiary of the transaction, (II) an address of a recipient or a beneficiary of the transaction, (III) a monetary amount of the transaction.

In some embodiments, the method comprises: (A) during entry of transaction data by said user via the electronic device, activating a video camera of said electronic device and capturing a video feed of said user, and also, activating a microphone of said electronic device and capturing an audio feed of said user; (B) during the capturing of the video feed and the audio feed, causing the electronic device to perform at a particular time-slot, at least one modulation that is selected from the group consisting of: (I) a visual modulation that affects video captured by the camera, (II) an audible modulation that affects audio captured by the microphone; (C) performing an analysis of captured video and captured audio, that were captured by the electronic device during entry of data of said transaction, to detect whether or not the captured video and the captured audio reflect, at said particular time-slot, said at least one modulation.

The particular modulation(s) that are performed may be selected locally in the end-user device 110; or may be selected remotely at the remote server 150 and then conveyed as signals indicating to the end-user device 110 which modulation(s) are required to be performed; or may be a combination or an aggregation of locally-selected modulations and remotely-commanded modulations. For example, a Modulations Client-Side Selector Unit 143 may select one or more modulations to apply, from a locally-stored Modulations Pool 144, based on one or more pre-defined triggers or conditions or criteria (e.g., the electronic device 110 detects that the user is commencing a process to perform a wire transfer to a new payee); and/or, a Modulations Server-Side Selector Unit 173 may select one or more modulations that the electronic device 110 should apply, from a remotely-stored Modulations Pool 174, based on one or more pre-defined triggers or conditions or criteria (e.g., the remote server detects that the electronic device is logged-in from an IP address or from a geo-location that was not associated in the past with this particular electronic device). In some embodiments, the particular modulation that is selected to be applied, or the particular set or group of modulations that is selected to be applied, may be selected by taking into account, for example, the type of the transaction being submitted or entered (e.g., selecting an illumination modulation for a wire transfer transaction, or selecting an audio modulation for an online retail purchase transaction), and/or based on the monetary amount involved in the transaction (e.g., selecting an illumination modulation for a wire transfer having a monetary amount that is greater than $750, or selecting an audio modulation for a wire transfer having a monetary amount that is equal to or smaller than $750), and/or based on the geographic region or the geo-location of the current end-user or of the recipient (e.g., if geo-location of the current user indicates that he is located within the United States then apply illumination modulation; if geo-location of the current user indicates that he is located within Russia then apply audio modulation), and/or based on the geographic region or the geo-location of the recipient or beneficiary (e.g., if the beneficiary address is within the United States then apply an illumination modulation; if the beneficiary address is within China then apply an audio modulation), and/or based on the current time-of-date or day-of week (e.g., avoiding an audio modulation if the local time at the end-user device is estimated to be 3 AM; or conversely, in some implementations, select an audio modulation during night-time at the end-user device), and/or based on other parameters or conditions. In some embodiments, two or more modulations may be selected and applied in series, within the same video capture or audio capture or image(s) capture process, and within the same single transaction that is being submitted or entered; for example, User Adam performs a wire transfer transaction which takes him 45 seconds; during the first quarter of the transaction, an illumination modulation is performed; during the third quarter of the same transaction, an audio modulation is performed; during the last quarter of the same transaction, a device vibration modulation is performed. In some embodiments, two or more modulations may be selected and applied in parallel or concurrently or simultaneously, or in two time-slots that are at least partially overlapping with each other, within the same video capture or audio capture or image(s) capture process, and within the same single transaction that is being submitted or entered; for example, User Bob performs a wire transfer transaction which takes him 60 seconds; during the second quarter of the transaction, an illumination modulation is performed for 3 seconds, and in parallel, a device vibration modulation is performed for 2 seconds. In some embodiments, the modulation(s) are selected exclusively on the client side, on the end-user device; in other embodiments, the modulation(s) are selected exclusively on the server side, such as, on the server that runs the application that processes the transaction (e.g., a server-side banking application that runs on a server of a bank; a server-side securities trading application that runs on a server of a securities trading firm; an e-commerce server-side application that runs on a server of an online merchant; a trusted server or a fraud-detection server that is run or administered by a trusted third-party that provides security-related services to banks or retailers or other entities); in still other embodiments, the modulation(s) are selected by cooperation between the client-side device and the remote server; in yet other embodiments, one or more modulations are selected locally by the end-user device, and one or more additional modulations are selected remotely by the remote server. Other suitable modulation schemes may be used.

Description of Some Additional Embodiments

Some embodiments provide systems, devices, and methods for: securing online transactions; securing transactions that are performed or requested via an electronic device; detecting and mitigating fraudulent transactions and/or fraud attempts; detecting and mitigating cyber-attacks (e.g., malware-based attack; Man in the Middle (MITM) attack; Man in the Browser (MITB) attack; Remote Access Trojan (RAT) attack; HTML injection attack; Overlay window attack; social engineering attack; phishing attack; or the like); detecting and mitigating an attack in which an impostor or an unauthorized user attempts to perform a transaction while posing to be the authorized/legitimate/genuine user; detecting and mitigating an attack that is performed during a log-in process to an account; detecting and mitigating an attack that is performed subsequently to a log-in process to an account, or an attack that is performed towards an already logged-in account.

In accordance with some embodiments, the electronic device (e.g., laptop computer, smartphone, tablet) of the end-user has one or more components and/or sensors and/or biometric sensors; for example, a camera or imager able to capture images and/or video; an acoustic microphone able to capture audio and/or voice and/or speech and/or ambient noises; a fingerprint scanner or reader; a Face Recognition unit able to recognize a user based on analysis of an image or video of his face; a mechanical vibrations unit able to cause the electronic device to vibrate and/or to provide haptic feedback or tactile feedback; one or more accelerometers and/or gyroscope units and/or compass units and/or spatial-orientation sensors; an audio speaker able to generate and output sound; a speaker or other component able to generate sound that can be heard by humans; a speaker or other component able to generate sound in frequencies that cannot be heard by humans (e.g., sounds outside the borders of human hearing of 20 to 20,000 Hz; or sounds outside the borders of hearing for many humans, such as 1,000 to 10,000 Hz, or 2,000 to 5,000 Hz); a touch-screen or touch-pad able to sense touches or taps of finger gestures of the user; or the like.

In a demonstrative method, the following steps may be performed.

Step (1):

During a time-period in which the user performs a transaction or an interaction via the electronic device (e.g., the user is filling-out a form to request a wire transfer on a banking website or a banking application; the user is writing an email message in an email or web-mail account), a parameter or a biometric parameter is obtained or measured or sensed by the electronic device of the user, or a sensing or biometric sensing event is performed by the electronic device of the user.

In some implementations, the sensing event may be known to the user; for example, the user is aware that the camera of the laptop is capturing a video of him, and/or the banking application notifies the user that video is being recorded by the camera of his computer. In some implementations, the sensing even may be transparent or unknown to the user; for example, the user is not aware that a microphone of the smartphone is currently capturing audio, or that a spatial-orientation sensor of the tablet is currently sensing spatial orientation of the tablet.

In some embodiments, during the interaction of the user with the electronic device, for example: the camera or imager is activated and captures video or images; the microphone is activated and captures audio that is hearable by humans or by most humans; the microphone or other sensor is activated and detects or captures audio that is non-hearable by humans or is non-hearable by most humans; the accelerometer and/or gyroscope unit and/or compass unit and/or spatial-orientation sensor of the electronic device sense acceleration and/or deceleration and/or spatial orientation of the device and/or changes in such parameters (e.g., sensing that the device is being rotated or spun or moved or tapped or engaged); the touch-screen or touch-pad of the electronic device senses that it is being engaged (e.g., finger dragging, click, tap, zoom-in gesture, zoom-out gesture, scroll gesture); the accelerometer and/or gyroscope unit and/or compass unit and/or spatial-orientation sensor of the electronic device sense that the electronic device is vibrating, or is generating haptic feedback or tactile feedback; or the like.

Step (2):

The one or more sensors of the electronic device of the user, capture and/or collect and/or record information, (i) that was generated actively by the electronic device and/or the user, and/or (ii) that was generated passively by the electronic device and/or the user, during the transaction or during the engagement of the user with the electronic device.

In a first example, the user enters data into a wire transfer form in a banking website by typing on a mechanical keyboard/physical keyboard of a laptop computer; and the typing operations make particular noises, at particular time-points (e.g., exactly when the user click-down on a key in the keyboard); and an acoustic microphone of the laptop computer captures and records the audio which includes those typing sounds. As described herein, these particular noises or sounds, that are captured "passively" by the electronic device, are used by the system in order to extract information, that can be used by the system in order to verify (or authenticate) the transaction (and/or the user), or in order to determine that a fraud is performed or is attempted. For example, an analysis of the captured audio may indicate that the user has typed exactly 7 characters (e.g., "Bob Doe", which has six letters and one space) when he was typing the Beneficiary Name in the wire transfer form, since an analysis of the audio recorded by the acoustic microphone of the laptop detects 7 distinct "click" sounds (or "key down" sounds from the mechanical keyboard); however, the Beneficiary Name string that was actually received at a remote server (e.g., the banking server) is "Alexander Potemkin", which has 9+1+8=18 characters; and since the number of "keyboard clicks" (only 7) is different, and even significantly different, from the length of the received string (18 characters), the system may determine that an attack is performed or is attempted; such as, by a malware that replaces strings that the user entered with strings that the malware-operator had defined, or by a Man in the Middle (MITM) attack which replaced the Beneficiary Name string on its way from the laptop computer to the server.

In some embodiments, the analysis of the audio signals may be further tailored or refined, by differentiating among particular keys in the keyboard. For example, realized the Applicants, in many mechanical keyboards, the Space Bar is elongated and may have s slightly different "click" noise relative to other keys (e.g., relative to the "a" key or the "b" key). Also, realized the Applicants, some particular keys (e.g., the Enter key, or the Shift key) are typically twice or thrice the size of a regular key, and thus they have a slightly different "click" noise relative to other keys (e.g., relative to the "a" or "b" keys; and also relative to the Space Bar). Also, realized the Applicants, the typing of some characters may typically exhibit a particular or distinct noise; for example, typing of the character @ in an email address, often requires to firstly click on Shift and then to click on the "2" key, thus exhibiting a rapid sequence of two clicks (Shift and 2) to produce one character (@); thereby again enabling the system to detect possible fraud attempts.

In some embodiments, a sequence or pattern or rhythm of "clicks" on keys may be monitored and analyzed in order to detect fraud. For example, realized the Applicant, when the end-user needs to type the word "street" in the Beneficiary Address field, many users would type the two "e" characters rapidly, with the time-gap between the two "e" characters being shorter than the gap between the second "e" and the following "t". The captured audio signal can be analyzed to determine whether such particular rhythm is indeed audibly detected; thereby enabling the system to differentiate or distinguish between "Rock Avenue" that was typed by the user and "Pine Street" that was replaced by a malware, or vice versa; based on the existence or the lacking of two consecutive rapid sounds of the two consecutive "e" characters.

In a second example, the electronic device of the user is configured to generate or make or emit a particular sound, which may be hearable by humans, upon each key-press on a mechanical/physical keyboard, or even upon each on-screen tap on an on-screen keyboard; and optionally, each such sound may be unique or different per each pressed key.

For example, the user types "adam" on a mechanical keyboard; when he presses the "a" key for the first time, a first type of sound is generated by the electronic device (e.g., having a first particular Length in milliseconds, and/or having a first particular Pitch, and/or having a first particular Volume Level); then, when the user presses the "d" key, a second type of sound is generated by the electronic device (e.g., having a second particular Length in milliseconds, and/or having a second particular Pitch, and/or having a second particular Volume Level); then, when the user presses the "a" key for the second time, the same sound of the first type (like in the first typing of the "a" key) is generated; and then, when the user presses the "m" key, a third type of sound is generated by the electronic device (e.g., having a third particular Length in milliseconds, and/or having a third particular Pitch, and/or having a third particular Volume Level); thereby creating a unique sound pattern for this particular word that can be denoted "1-2-1-3". The audio recording of the user and his surrounding, may be analyzed in order to detect whether or not it indeed includes or reflects these sounds and/or this pattern, in order to verify or deny the transaction or in order to generate a fraud notification.

In a third example, the electronic device of the user is configured to generate or make or emit a particular sound, which is non-hearable by humans or is non-hearable by most users (e.g., an infra-sonic sound or ultra-sonic sound), upon each key-press on a mechanical/physical keyboard, or even upon each on-screen tap on an on-screen keyboard; and optionally, each such sound may be unique or different per each pressed key. The acoustic microphone of the electronic device, and/or a different sensor or component of the electronic device which may be particularly configured for detecting and/or analyzing infra-sonic/ultra-sonic sounds and/or non-hearable (by humans) sounds, may capture or detect or record such sounds; and they are analyzed similarly to the analysis described above in order to verify or deny the transaction or to detect possible fraud.

In some embodiments, optionally, a different infra-sonic (or ultra-sonic) sound, having a different infra-sonic frequency and/or characteristics, may be generated by the end-user device and may be sensed by its microphone or sensor, per each key or tap. For example, the electronic device may be configured to emit an infra-sonic sound of 20 milliseconds at a frequency of 5 Hz, when the user presses the "a" key; and may be configured to emit an ultra-sonic sound of 30 milliseconds at a frequency of 22,000 Hz, when the user presses the "b" key; thereby enabling the system to detect, from the recorded or captured audio (and particularly from the audio that is non-hearable by humans) which keys were actually pressed or tapped by the user, on the mechanical/physical keyboard or on the on-screen keyboard/keypad.

In another embodiment, the sounds (infra-sonic/ultra-sonic sounds, or human hearable sounds) may be generated by the electronic device in accordance with a particular pattern, which may later be checked or verified against the recorded signal of the audio (hearable or non-hearable audio). For example, the electronic device may be configured to generate the following five sounds in response to the next five key-presses, regardless of which keys were pressed: (i) an infra-sonic sound of 10 milliseconds at 18 Hz, then (ii) an ultra-sonic sound of 25 milliseconds at 24,000 Hz, then (iii) an infra-sonic sound of 30 milliseconds at 75 Hz, then (iv) an ultra-sonic sound of 8 milliseconds at 29,000 Hz, then (v) an infra-sonic sound of 24 milliseconds at 40 Hz; regardless of whether the user typed the word "smith" or the word "brown". The recording of such audio may enable the system to determine that exactly Five characters/keys were pressed during the actual typing by the end-user on the electronic device; and thus, may enable the system to detect fraud if the string of data that was sent by the electronic device to the server was replaced (by a malware, or by a MITM attacker) to "alexander". It is also noted that in this example, the server or the computer that performs the analysis, need not even know whether the genuine user has actually typed "smith" or "brown", and the system can thus achieve improved levels of confidentiality and/or privacy as well as reduced data-collection; as this information (of which string exactly was typed by the genuine user) is not required in order for the system to determine that the name "alexander" is a replacement/fraudulent name, and not the five-letters name that was actually typed by the genuine user.

In a third example, the electronic device of the user is configured to generate a vibration, or a particular and different vibration, upon every keypress (or tap, or gesture) on an on-screen keyboard/keypad; and those vibrations may implicitly appear in an audio recording or a video recording of the transaction by that same electronic device, or those vibrations may implicitly affect or modify the audio or video that is captured by a microphone or camera of that same electronic device, in a manner that enables the system to verify the transaction or to detect that a fraudulent operation was performed.

For example, the electronic device of the user is a smartphone, and is configured to generate: a vibration of 10 milliseconds if "b" is pressed; and a vibration of 50 milliseconds if "o" is pressed. The genuine user types the word "bob"; and the electronic device vibrates for 10 milliseconds upon the typing of the first "b", then after a short vibration-free time-period it vibrates for 50 milliseconds upon the typing of the letter "o", and then after another short vibration-free time-period it vibrates again for 10 milliseconds upon the typing of the second "b". In one implementation, the acoustic microphone of the smartphone is continuously capturing and recording the audio during the user engagement with the smartphone and during the transaction entry process; and an analysis of the recorded audio enables the system to determine whether or not it includes those three unique vibration sounds, at those time-lengths. For example, if no vibration sounds are detected from the captured audio, then the system may determine that the string "bob" was not at all typed by the legitimate human user; but rather, was sent to the server by an automated malware that resides on the smartphone. In another example, the analysis of the audio recording of the transaction indicates the existence of Nine distinct vibration sounds; thereby enabling the system to determine that the string "bob" that it received is a fraudulent string, as it was supposed to generate only three vibration sounds and not nine. In another example, detecting Nine distinct vibration sounds may assist the system to confirm the authenticity of the transaction when the received string is "alexander" (having nine characters, matching the number of vibration noises).

In another example, the vibrations are generated not necessarily in response to a particular keypress; but rather, in accordance with a particular timing scheme and/or pattern and/or sequence and/or rhythm, which can be later verified or detected by the system (based on analysis of the audio noises or sounds, recorded by the acoustic microphone) in order to verify or deny the transaction. For example, the user spends 30 seconds to fill-out the Wire Transfer form in a banking website, using a Tablet such as "Samsung Galaxy Tab S7" which is equipped with a vibration motor. During that 30-second process of data entry by the user, the Tablet generates and performs a particular sequence of vibrations: (i) first, a generated vibration of 0.8 seconds; (ii) then, a vibration-free period of 5 seconds; (iii) then, a generated vibration of 0.2 seconds; (iv) then, a vibration-free period of 9 seconds; (v) then, a generated vibration of 0.5 seconds. The microphone of the Tablet is continuously recording the ambient sounds during the transaction entry process, and that audio recording should reflect those particular vibrations (as audio noises) in accordance with those particular time-lengths (of each vibration) and in a accordance with those particular vibration-free time-gaps between each pair of vibrations. Detection of audio noises that correspond to this unique sequence of vibrations, may assist the system to confirm the authenticity of the transaction. In contrast, detection of no sequence at all of vibration-noises within the recorded/captured audio, may enable the system to determine that the transaction is not legitimate but rather, for example, was entered or submitted by an automated malware that runs on that Tablet, and not by a human user or not by the authorized human user.

In another example, the generated vibrations affect the video recording or the video capturing by the camera of the Tablet; and an analysis of the content of the video—and not necessarily the audio—may assist the system to verify or deny the transaction. For example, realized the Applicant, a forced vibration of the Tablet also causes a video captured by its camera to have a unique visual or visible effect; for example, the video may show the user's face generally not moving when there are no induced vibrations to the Tablet, but the video may show the user's face shaking back-and-forth for a short time when the Tablet is vibrating (since the imager or camera of the Tablet is also vibrating/shaking slightly due to the vibration motor of the Tablet which vibrates the entire Tablet). An analysis of the video content may thus assist to verify or deny the transaction.

For example, the electronic device of the user is a smartphone, and is configured to generate: a vibration of 10 milliseconds if "b" is pressed; and a vibration of 50 milliseconds if "o" is pressed. The genuine user types the word "bob"; and the tablet vibrates for 10 milliseconds upon the typing of the first "b", then after a short vibration-free time-period it vibrates for 50 milliseconds upon the typing of the letter "o", and then after another short vibration-free time-period it vibrates again for 10 milliseconds upon the typing of the second "b". In one implementation, the front-side camera of the tablet is continuously capturing and recording video during the user engagement with the tablet and during the transaction entry process; and an analysis of the content of the recorded video enables the system to determine whether or not it includes those three unique vibration sounds, at those time-lengths. For example, if no visual hints or effects of results of vibration are detected in the recorded video content, then the system may determine that the string "bob" was not at all typed by the legitimate human user; but rather, was sent to the server by an automated malware that resides on the smartphone. In another example, the analysis of the content of the video recording of the transaction indicates the existence of Nine distinct vibration events (e.g., based on Nine different events in which the face of the user "shook" back and forth for less than one second); thereby enabling the system to determine that the string "bob" that it received is a fraudulent string, as it was supposed to generate only three vibration events and not nine. In another example, detecting Nine distinct vibration events in the visual content of the recorded video, may assist the system to confirm the authenticity of the transaction when the received string is "alexander" (having nine characters, matching the number of vibration events detected in the visual content of the recorded video).

In another example, the vibrations are generated not necessarily in response to a particular keypress; but rather, in accordance with a particular timing scheme and/or pattern and/or sequence and/or rhythm, which can be later verified or detected by the system (using an analysis of the visual content depicted in the recorded video) in order to verify or deny the transaction. For example, the user spends 30 seconds to fill-out the Wire Transfer form in a banking website, using a Tablet such as "Samsung Galaxy Tab S7" which is equipped with a vibration motor. During that 30-second process of data entry by the user, the Tablet generates and performs a particular sequence of vibrations: (i) first, a generated vibration of 0.8 seconds; (ii) then, a vibration-free period of 5 seconds; (iii) then, a generated vibration of 0.2 seconds; (iv) then, a vibration-free period of 9 seconds; (v) then, a generated vibration of 0.5 seconds. The front-side camera of the Tablet is continuously recording video during the transaction entry process, and the recorded video should reflect those particular vibrations (as short shaking events in the visual content, or short "jumps" of the visual content such as the face of the user) in accordance with those particular time-lengths (of each vibration) and in a accordance with those particular vibration-free time-gaps between each pair of vibrations. Detection of visual content (in the recorded video) that corresponds to this unique sequence of vibration events, may assist the system to confirm the authenticity of the transaction. In contrast, detection of no sequence at all of vibration-events within the recorded/captured video, may enable the system to determine that the transaction is not legitimate but rather, for example, was entered or submitted by an automated malware that runs on that Tablet, and not by a human user or not by the authorized human user.

In a fourth example, the electronic device of the user is configured to continuously capture or record video while the user is engaging with the electronic device to enter transaction details; and particularly, to capture a video of the keyboard area of a mechanical/physical keyboard. For example, the user utilizes a Laptop computer to enter transaction data into a banking website; and the camera of the laptop, which is a front-side camera, is a wide-angle camera or a fish-eye camera that is capable of capturing (among other regions) in its field-of-view the area of the mechanical/physical keyboard of that same Laptop. The visual content of the recorded video, can be analyzed against the data that was submitted during the transaction, in order to detect mismatches or anomalies that indicate possible fraud or attack. In a first example, the transaction data includes the word "street", which is typically typed by using only the left hand (by users who are proficient in "touch typing" or "blind typing"); but an analysis of the visual content that was recorded in the video shows that at the time of typing data into the Address Field, the left hand of the user did not type and only the right hand of the user is seen (in the recorded video) to be typing; thereby indicating fraud. In another example, the submitted string is "Montana", which requires the hands of the user to type characters on the left side and on the right side of the keyboard and across all the three lines of letters; but analysis of the visual content of the recorded video indicates that the user's hands were typing only on the left side of the physical/mechanical keyboard, or did not type at all onto the lowest line of letters of the keyboard (which is required for typing "m" and "n"); thereby indicating fraud. In another example, analysis of the visual content of the recorded video shows that in the video, the hands of the user type on at least Nine keys; whereas, the string that was submitted is "bob" and has only Three characters, thereby indicating possible fraud. In contrast, if the submitted string is "alexander", then the detection of Nine keys being pressed, based on the analysis of the visual content of the video, contributes to positive verification or approval of the transaction.

In another example, the electronic device of the user is configured to continuously capture or record video while the user is engaging with the electronic device to enter transaction details; and particularly, to capture a video of the touch-screen area of a touch-screen equipped device, such as smartphone or tablet. For example, the user utilizes a Tablet to enter transaction data into a banking website; and the front-side camera of the Tablet is a wide-angle camera or a fish-eye camera that is capable of capturing (among other regions) in its field-of-view the area which is adjacent to the touch-screen of the Tablet itself, or at least a part of that area. The visual content of the recorded video, can be analyzed against the data that was submitted during the transaction, in order to detect mismatches or anomalies that indicate possible fraud or attack. In a first example, the transaction data includes the word "street", which is typically typed—even on a touch-screen—by using only the left hand (by users who are proficient in "touch typing" or "blind typing"); but an analysis of the visual content that was recorded in the video shows that at the time of typing data into the Address Field, the left hand of the user did not type at all, and only the right hand of the user is seen (in the recorded video) to be typing on the touch-screen; thereby indicating fraud. In another example, the submitted string is "Montana", which requires the hands of the user to type characters on the left side and on the right side of the on-screen keyboard and across all the three lines of letters of the on-screen keyboard; but analysis of the visual content of the recorded video indicates that the user's hands were typing only on the left side of the on-screen keyboard, or did not type at all onto the lowest line of letters of the on-screen keyboard (which is required for typing "m" and "n"); thereby indicating fraud. In another example, analysis of the visual content of the recorded video shows that in the video, the hands of the user type on at least Nine keys of the on-screen keyboard; whereas, the string that was submitted is "bob" and has only Three characters, thereby indicating possible fraud. In contrast, if the submitted string is "alexander", then the detection of Nine keys being pressed on the touch-screen, based on the analysis of the visual content of the video that captures the vicinity of the touch-screen, contributes to positive verification or approval of the transaction.

Step (3):

Optionally, the system and method of some embodiments may encode transaction data (e.g., the transaction data that was entered by the end-user; such as Beneficiary Name, Beneficiary Account Number, Transfer Amount, or the like) into an auxiliary medium, and particularly into a video and/or an audio that is captured or recorded during the transaction; and such encoded transaction data can further be used to contribute to verification of the transaction integrity and/or authenticity.

In a first example, the end-user utilizes his Laptop to enter transaction data of a wire transfer, to the recipient "adam smith". The acoustic microphone of the Laptop is continuously recording audio, during the data entry process. Firstly, as described above, the recorded audio should reflect Ten key presses or "clicks" which correspond to the Ten characters of that string. Secondly, once the user submits the form with the "adam smith" data-item in it, that string is added or encoded into the audio file of the recorded audio, prior to the transmission of that audio file to a remote server for analysis; for example, by adding the string "adam string" (or an encoded or encrypted or hashed version thereof) at the end or at the beginning of the audio file, or at a particular offset from the beginning of the audio file (e.g., at offset 517 bytes from the beginning of the audio file); thereby providing a mechanism for an additional integrity check or an additional digital signature that uniquely ties this particular audio file, and this particular audio recording, to this specific transaction that was submitted for processing and that has a transaction data-item of "adam smith". For example, if the remote server receives an audio file of the audio recording; and analyzes the audio content and indeed detects audio noises of ten "clicks" (which generally match the manual typing of the data-item "adam smith"); but the audio file lacks, at the particular location, a copy of that particular string (or an encrypted/encoded/hashed version thereof), then the remote server may determine that the information was tampered or modified or replaced, at the electronic device itself and/or on the communication route from the electronic device to the remote server; thereby indicating a possible fraud. In contrast, detection of the string "adam smith", or an encrypted/encoded/hashed version thereof, at the 517-byte offset from the beginning of the audio file (or at another particular/pre-defined location; or at the header or commencement of the audio file; or at the tail or the ending of the audio file) may contribute to a determination that the transaction is authentic and verified.

In another example, the user utilizes a smartphone to type data; and the smartphone is configured to perform particular vibration events in response to typing of particular characters. The sequence of vibration events should be reflected in a video recording that is captured by the camera of the smartphone, as each vibration event would translate into a slight "jump" or a short "shaking" of the visual content shown in the video. Additionally or alternatively, the sequence of vibration events should be reflected in an audio recording that is captured by the microphone of the smartphone, as each vibration event would leave a short "bzzz" audio noise/hearable noise. Additionally or alternatively, the total number of vibration events, as well as data indicating their timing or their time-points or the time-gaps among them, may be inserted or encoded into the audio file/video file that are then transmitted to the remote server for analysis; thereby further tying this particular audio file/video file to this particular transaction and to this particular sequence of modulations or vibrations that were performed.

It is noted that in accordance with some embodiments, an external anomaly/aberration/interference/modulation is generated by the end-user computing device, while the user is entering transaction data and/or while the user is reviewing transaction data that he is about to submit and/or while the user is utilizing that same end-user computing device for entering or typing or submitting transaction data; and that such external anomaly/aberration/interference/modulation is generated exclusively by the end-user computing device as a machine-generated anomaly/aberration/interference/ modulation, and not as a human-generated utterance or gesture or other user behavior. For example, some embodiments do Not request and do Not require the user, to say aloud a word or a phrase, or to say aloud one or more data-items of the transaction data, in order to then "capture" such uttered speech of the user as an external audio segment that is recorded and/or that becomes part of a captured video or audio-and-video segment; as such systems put an additional burden and a non-transparent burden onto the end-user, and do not transparently follow the comfortable flow of operations that users typically follow. Rather, in accordance with some embodiments, the user is Not required/requested/prompted to say or to utter any particular phrase or data, and is Not required/requested/prompted to perform a particular behavioral gesture via a direct command to the user. Rather, some embodiments generate the external anomaly/aberration/interference/modulation by the end-user computing device, exclusively, and not by the human user; and then analyze the captured audio/video/audio-and-video to check whether or not such captured data indeed reflects therein the external anomaly/aberration/interference/modulation that was generated by the end-user computing device (and not by the human user).

In some embodiments, optionally, analysis of the captured audio and/or captured video and/or the captured audio-and-video may be performed locally on the end-user device (e.g., exclusively, without transmitting any captured data to a remote server), or may be performed externally on a remote server or a cloud-computing server (e.g., exclusively, such that raw data is sensed or captured locally at the end-user device, and is then transmitted (optionally in a compressed or encoded version, such as an H.264 or H.265 video file and/or an MP3 or OGG or AAC audio file) to a remote server for exclusive analysis and processing there); or, in some embodiments, at least some of the data is analyzed locally at the end-user device (e.g., to immediately detect an easy-to-computer fraud or an easy-to-detect fraud), and also at least some of the data is analyzed remotely at the remote server or the cloud-computing server (e.g., which may have more powerful computing resources than the local end-user device).

Optionally, the end-user device and/or the remote server and/or the cloud-computing server may utilize as an Artificial Intelligence (AI) engine/Machine Learning (ML) engine/Deep Learning (DL) engine/Reinforcement Learning (RL) engine/Neural Network (NN) engine and/or a combination of two or more such engines, in order to analyze the captured audio/video/audio-and-video, and/or in order to otherwise detect fraudulent or compromised or non-legitimate or non-authentic transaction that was submitted to the system. For example, such AI/ML/DL/RL/NN engine(s) may be particularly trained in advance, (I) on a first dataset of thousands or millions of audio segments/video segments of transactions that are known to be legitimate and/or that indeed reflect one or more external anomaly/aberration/interference/modulation by the end-user computing device; and/or (II) on a first dataset of thousands or millions of audio segments/video segments of transactions that are known to be fraudulent or illegitimate and/or that do not reflect (entirely, or sufficiently, or adequately) one or more external anomaly/aberration/interference/modulation by the end-user computing device. Items in each such dataset may be pre-classified by human classifiers; or may be obtained from a trusted source; for example, a dataset of thousands of legitimate transactions (and their surrounding data) can be obtained from a bank or a retailer, reflecting thousands of transactions that occurred 2 or 3 years ago and that were never disputed by their respective clients; and similarly, a dataset of thousands of fraudulent or illegitimate transactions (and their surrounding data) can be obtained from a bank or a retailer, reflecting thousands of transactions that occurred 2 or 3 years ago and that were disputed by their respective clients and that were investigated by the bank/retailer and were found to indeed be fraudulent; thereby allowing to construct such pre-classified datasets, and to train the AI/ML/DL/RL/NN engine(s) on such datasets, and to construct a plurality of data classifiers or data transformers or data encoders that can utilize such AI/ML/DL/RL/NN analysis to classify a freshly-captured/freshly-submitted transaction as either fraudulent or legitimate, or to predict or estimate or determine a certainty level (e.g., in a range of 0 to 100) with regard to authenticity or illegitimacy of a freshly-captured/freshly-submitted transaction.

In some embodiments, the above-mentioned features or mechanisms may be available for developers, via a programming language and/or via an Application Programming Interface (API); and/or by making these features or mechanism an integrated part of an Operating System (OS); and/or by implementing these features or mechanisms (or at least some of them) as hardware components or as hardcoded functions (e.g., in Firmware or ROM, or on a circuit board or micro-code of a hardware processor). For example, a website developer or an application developer or an "app" developer may efficiently interface with these features or mechanisms, or may be able to "call" or invoke them, via a programming language command or subroutine or function or code-portion.

For example, HTML5 allows a developer to define <input type="text"> in order to cause a smartphone to display a full on-screen keyboard for data entry (e.g., suitable for requesting the end-user to type a street address); or to define instead <input type="number"> in order to cause the smartphone to display an on-screen numeric keypad (e.g., suitable for requesting the end-user to type a monetary amount).

In accordance with some embodiments, such developer would also be able to define, for example, <input type="number with vibration-audio verification"> to invoke (e.g., from the Operating System or from the Hardware itself, directly and/or via API or programming language) a data-entry function that displays an on-screen numeric keypad and also automatically invokes background audio recording of the data-entry session, and also generates particular vibrations or a particular sequence of vibrations, and also checks the integrity of the entered data based on matching or mis-matches between the known vibration events and the vibration-noises that exist or do not exist in the recorded audio.

In accordance with some embodiments, the developer would also be able to define, for example, <input type="number with vibration-video verification"> to invoke (e.g., from the Operating System or from the Hardware itself, directly and/or via API or programming language) a data-entry function that displays an on-screen numeric keypad and also automatically invokes video recording of the data-entry session, and also generates particular vibrations or a particular sequence of vibrations, and also checks the integrity of the entered data based on matching or mis-matches between the known vibration events and the visual content shown in the captured video.

In accordance with some embodiments, the developer would also be able to define, for example, <input type="text with typing video verification"> to invoke (e.g., from the Operating System or from the Hardware itself, directly and/or via API or programming language) a data-entry function that activates the camera of a Laptop or Tablet to continuously record of the data-entry session via a physical keyboard (of the Laptop) or an on-screen keyboard (of the Tablet); and also checks the integrity of the entered data based on matching or mis-matches between (i) the transaction data that was submitted, and (ii) analysis of hand/finger gestures and movements as they are visually depicted in the captured video.

In accordance with some embodiments, the developer would also be able to define, for example, <input type="text with infrasonic and ultrasonic noises"> to invoke (e.g., from the Operating System or from the Hardware itself, directly and/or via API or programming language) a data-entry function that generates such non-hearable noises, and that also analyzes the captured audio to detect whether the captured audio indeed reflects such noises at particular time-lengths and/or frequencies and/or volume levels and/or with particular time-gaps.

In accordance with some embodiments, the developer would also be able to define, for example, <input type="text with hearable audio markers"> to invoke (e.g., from the Operating System or from the Hardware itself, directly and/or via API or programming language) a data-entry function that generates such hearable noises, and that also analyzes the captured audio to detect whether the captured audio indeed reflects those particular audio markers at particular time-lengths and/or frequencies and/or volume levels and/or with particular time-gaps.

In accordance with some embodiments, the developer would also be able to define, for example, <input type="text with hearable audio markers and with data-item encoding into the audio file"> to invoke data-entry process or interface that generates the hearable audio markers as described, and that also encodes the user-submitted data-item into the audio file; thereby enabling the system to further check the integrity of the audio file and its unique linkage to this particular transaction and to the specific set of data-items that were submitted as this particular transaction data.

Other suitable commands or parameters or functions may be used, to enable a developer to efficiently invoke one or more of the mechanisms described above or herein, or a combination of two or more such mechanisms. In some embodiments, such mechanisms may be implemented via a browser extension/add-on/plug-in, or may be an integral part of a secure browser or a secure transaction-submitting application or "app"; and such programs or browsers or browser extension/add-on/plug-in may include an Interpreter Unit or a Parsing Unit, that can capture/parse/intercept/interpret such commands that the developer wrote as part of the code (e.g., as part of HTML or JavaScript code), and to intercept/modify/augment the execution of regular/conventional data-entry methods, by invoking or triggering a secure data-entry module that generates the external anomaly/interference/aberration/modulation during the data-entry/data-typing process, and that causes the capturing of audio/video/audio-and-video, and that causes the local and/or remote analysis of the content of such captured audio/video/audio-and-video in order to check whether or not it adequately/correctly reflects the device-generated external anomaly/interference/aberration/modulation.

In some embodiments, the system may implement other and/or additional mechanism to further secure and/or verify and/or authenticate the submitted transaction and/or the user identity. For example, in a demonstrative embodiment, the end-user (e.g., a client or a customer of a bank) utilizes an electronic end-user device (e.g., smartphone, tablet, laptop computer, desktop computer) in order to interact with a computerized service (e.g., a banking application or "app" or native application, or a web-based app or an in-the-browser application, or a website through which the computerized service may be accessed, via a dedicated application or via a web browser; or the like). The end-user device has a Secure Processing/Memory Sub-system (SPMS), such as, Secure Enclave, a System-on-a-Chip (SoC) secure system, a Trusted Execution Environment (TEE) or a Secure Execution Environment (SEE), or other isolated or secure processing unit (or, a secure or isolated area of a processing unit), typically associated with its own secure memory or protected memory. In some embodiments, the SPMS necessarily includes at least one secure hardware component, such as a secure processing environment and/or a secure execution environment and/or a secure storage. In other embodiments, the SPMS may optionally be implemented using software components or modules; for example, using a sandbox or a sandboxing mechanism for separation between running programs, using a Virtual Machine (VM), or using a memory unit or a memory region that is managed (e.g., exclusively) by the browser or by the app itself.

The system of some embodiments may operate to ensure, to a Relying Party or a Relying Entity (e.g., a bank, a credit card company, a securities brokerage firm, a financial institution, an online retailer, an e-commerce provider; and/or a computer server of such entity or party) that a submitted transaction, or a submitted set of data-items of such submitted transaction, are indeed authentic and reflect data that was entered or provided by the legitimate or authenticated user via his electronic end-user device; and not by a human attacker or an automated attacking unit.

For example, the end-user is accessing the computerized service for the first time, and performs an initial registration process or onboarding process. During this process, the end-user device collects or senses or measures one or more biometric data-items of the user; for example, a fingerprint scan, face scan, eye/retina scan, palm scan, audio utterances or audible speech for voice recognition, or the like. The biometric data-item is stored directly and securely into the SPMS of the end-user device; and in some embodiments, is not stored (not even temporarily) in regular or non-secure memory unit or storage unit or RAM unit or SSD unit or HDD unit of the end-user device.

The SPMS generates a pair of encryption keys, such as a pair of asymmetric keys that include a Private Key and a Public Key. For example, two very large prime numbers (p and q), that are generally the same size (e.g., having the same or similar number of digits), may be used with modulo arithmetic for this purpose.

The Private Key remains exclusively within the SPMS of the end-user device, and is never shared or transferred or transmitted or copied outside of the end-user device, and is never shared or transferred or copied to any other Non-SPMS unit of the end-user device itself (e.g., is never copied or transferred to the RAM memory unit of the end-user device, or to a non-secure/non-protected processing unit of the end-user device).

The Public Key is transmitted or sent to a server of the Relying Entity, over a secure communication channel such as Secure Sockets Layer (SSL)/Transport Layer Security (TLS), accompanied by a digital certificate of authenticity, thereby ensuring that the transmitted information (the Public Key) can be decrypted only by the intended recipient (the server of the Relying Entity) and not by other entities.

In a first type of implementation, subsequent data that is sent from the end-user device to the Relying Entity, is verified and authenticated on and by the server of that Relying Entity. For example, the user enters transaction data on his end-user device; the end-user device performs an access (e.g., via a dedicated application or a browser) to the server of the Relying Entity, and obtains therefrom the Public Key of the Relying Entity together with an SSL/TLS digital certificate that ensures that the accessed server (or website) indeed belongs to (or, is indeed associated with or controlled by) that Relying Entity. The end-user device encrypts, using the Public Key of the Relying Entity, the transaction data that was entered by the user and/or the biometric data that was captured or scanned or measured or collected with regard to that transaction, and/or a fused data-item that represents both the transaction data and the collected biometric data. The encrypted data is then sent from the end-user device to the server of the Relying Entity over a secure communication channel (e.g., using SSL/TLS). The server of the Relying Entity is the exclusive holder of the Private Key of the Relying Party; and therefore, only the server of the Relying Party is able to decrypt the incoming encrypted data. Accordingly, the data cannot be tampered with (or modified, or replaced) during its transport from the end-user device to the server of the Relying Entity; and an eavesdropper that manages to obtain a copy of that encrypted data cannot decrypt it.

In a first type of implementation, subsequent data that is sent from the end-user device to the Relying Entity, is verified and authenticated by utilizing a challenge/response mechanism that involves both the server of the Relying Entity and the end-user device; and particularly, such that transaction data and/or verification data is compared within the SPMS of the end-user device. For example, the end-user performs entry of transaction data on his end-user device; biometric information is collected or scanned or captured by the end-user device during the data entry process; and both the transaction data and the collected biometric data—together with a time-stamp—are securely stored in the SPMS of the end-user device. The SPMS checks whether the freshly-captured biometric data matches the previously-stored biometric data (e.g., that was collected from the user during the registration/onboarding process). If not, the SPMS blocks or denies the transaction. If yes, the SPMS proceeds to signal the relevant application (or browser) on the end-user device that the biometric authentication succeeded; and the application (or browser) sends the transaction data to the server of the Relying Entity over a secure communication channel.

The server of the Relying Entity receives the transaction data; and prepares a Challenge Message. For example, the Challenge Message may include: (I) a copy of the transaction data that was received at the server of the Relying Entity, including therein the biometric data, or, (II) a one-way hashing result of said transaction data and biometric data as received at the server of the Relying Entity and that was passed through a one-way hashing unit; and also, (III) a time-stamp; and optionally also, (IV) a large pseudo-random number (a Large Nonce; e.g., a 64-decimal-digital pseudo-random number) that was generated by the server of the Relying Entity. The Challenge Message then encrypted and/or digitally signed at the server of the Relying Entity, by utilizing the Public Key of the end-user device as an encryption key and/or digital signature key. The encrypted and signed Challenge Message is sent from the server of the Relying Entity to the end-user device, over a secure communication channel.

The end-user device receives the Challenge Message via the application/browser, and the Challenge Message is transferred to the SPMS for processing. The SPMS (and only the SPMS) has the Private Key of the end-user device; and therefore, the SPMS decrypts the Challenge Message utilizing the Private Key of the end-user device.

The SPMS utilizes the time-stamp in the Challenge Message, in order to search through a secure storage of entered/submitted transactions, and to locate the particular transaction based on that time-stamp; if no matching transaction is find by the SPMS, then the SPMS signals the application that the transaction failed to authenticate or that the transaction is aborted or denied; or (in some implementations) the SPMS remains silent and does not generate any signal regarding this transaction, and the server of the Relying Party will abort or deny or discard the submitted transaction after T minutes since no response at all was received to the Challenge Message within T minutes.

If the SPMS finds the matching transaction data, then the SPMS checks whether the biometric data that was received from the server of the Relying Entity indeed matches the biometric data that was previously securely stored in the SPMS (e.g., comparing to the biometric data that was stored in the SPMS during the onboarding/registration process; and/or comparing to the biometric data that was stored in the SPMS during the fresh entry of the data of this particular transaction that is the subject of this Challenge Message). If the biometric data fails to match, then the SPMS signals the application that the transaction failed to authenticate or that the transaction is aborted or denied; or (in some implementations) the SPMS remains silent and does not generate any signal regarding this transaction, and the server of the Relying Party will abort or deny or discard the submitted transaction after T minutes since no response at all was received to the Challenge Message within T minutes.

If the biometric data is matched by the SPMS, then the SPMS proceeds to compare between (i) the transaction data received in the Challenge Message, and (ii) the transaction data as previously stored in the SPMS during or upon the actual data entry of that transaction via the end-user device. In some embodiments, transaction data from the Challenge Message is compared to transaction data stored in the SPMS; in other embodiments, a one-way hashing result of the transaction data is included in the Challenge Message, and is compared to a one-way hashing result of the relevant transaction data within the SPMS.

If the comparison indicates a non-match, then the SPMS signals the application that the transaction failed to authenticate or that the transaction is aborted or denied; or (in some implementations) the SPMS remains silent and does not generate any signal regarding this transaction, and the server of the Relying Party will abort or deny or discard the submitted transaction after T minutes since no response at all was received to the Challenge Message within T minutes.

If the comparison indicates a match, then the SPMS extracts the Large Nonce from the Challenge Message; transfers it to the application/browser; which in turn proceeds to send the Large Nonce as a Response Message over a secure communication channel (SSL/TLS) to the server of the Relying Entity; which, in turn, is able to receive Response Message having that Large Nonce and to check whether it matches the Large Nonce that was previously generated by the server of the Relying Entity and that was inserted into the Challenge Message.

If they match, then the server of the Relying Entity proceeds to authorized and/or to execute the relevant transaction. If they do not match, then the server of the Relying Entity aborts or fails or denies the transaction. If the sever of the Relying Entity did not receive the correct Response Message with the correct Large Nonce, within T minutes from sending out the Challenge Message, then the server of the Relying Entity aborts or fails or denies the transaction.

In accordance with some embodiments, the end-user device includes: one or more input units that the user may utilize in order to enter transaction data (e.g., physical keyboard, on-screen keyboard on a touch-screen, mouse, touch-pad); one or more biometric sensors (e.g., camera to capture face image or eye/retina image; acoustic microphone to capture audio/speech for voice recognition; fingerprint scanner); an application (native application, dedicated application, web browser) for accessing and interacting with a computerized service (e.g., of a bank or other Relying Entity); and the SPMS mentioned above.

During or upon the registration/onboarding process of the end-user, the SPMS saves therein a biometric template or a biometric "reference profile" of the user. Additionally, the SPMS stores the encryption key pair; including the Private Key (that never leaves the end-user device, and in some implementations never leaves the SPMS itself) and the Public Key (that may leave the end-user device).

The end-user device is utilized by the user in order to register at a service or a server of a Relying Entity. During such registration process, the end-user device provides or sends, to the Relying Entity server, a copy of the Public Key of the end-user device; or, the Relying Entity server obtains from the end-user device a copy of the Public Key of the end-user device.

The Relying Party and its server may define or configure, which particular operations or actions via the application that is running on the end-user device (e.g., a native/dedicated application, or an in-browser application) would be handled as Elevated Security or Elevated Protection operations/transactions; for example, it may configure that a "Wire Transfer" process (or URL, or function, or form, or field, or object) would be associated with Elevated Security, whereas a "Show me my Balance" process would not be associated with Elevated Security. In some embodiments, optionally, instead of such advance configuration and/or in addition to it, the Relying Entity server may dynamically determine, on the fly, that a particular operation or transaction or function would be treated as requiring Elevated Security; and the Relying Entity server may send a triggering signal or a triggering message (e.g., over a secure communication channel) to the application/browser of the end-user device, to trigger a requirement for Elevated Security with regard to such particular transaction or operation, for this particular user, and in this particular usage-session. It is also noted that in case the end-user device is shared by two or more legitimate users (e.g., a laptop computer at home, utilizes by each parent to access a joint bank account, and also utilized by children for gaming), the system may define or configure which particular user(s), and his/her/their respective biometric data, would be authorized to access the service of the Relying Party and/or to submit transactions to the Relying Party server.

Once a particular transaction, or a particular type-of-transactions, is defined or configured as an Elevated Security transaction or type-of-transaction, or once such particular transaction is triggered (e.g., based on a signal or message from the Relying Party server), then: the biometric sensor(s) are required to be utilized in order to authenticate or verify the transaction, in a secure manner that is controlled by the SPMS.

For example, the biometric sensor(s) perform sensing or measuring or biometric data-item collection (e.g., face image, eye/retina image, audio utterance or speech sampling, fingerprint) while the user is utilizing the end-user device to engage with the computerized service and/or to enter transaction data (e.g., while the user fills-out a form of Wire Transfer). The biometric measurements or samples are securely stored by the SPMS in secure memory, together with a time-stamp for each biometric collection time-point. The biometric measurements or data does not exit from the SPMS (or from the secure memory) to the non-secure application(s) that may run on the end-user device, nor to the browser, non to the application that is installed or running on the end-user device on behalf of the Relying Entity, nor to any other user-mode application or user-mode application or any entity outside the end-user device.

The transaction data that was entered via input unit(s) of the end-user device, is transferred from those input unit(s) to the SPMS; optionally, with the relevant time-stamps of each time-point of data entry or user interaction; or, in some embodiments, the SPMS itself creates and stores those time-stamps of those data-entry/interaction time-points, to prevent tampering or compromise or manipulation or replacement of modification of the time-stamps by a user-level/user-mode malware or by other malware (e.g., in-the-browser malware).

The transaction data that was entered via input unit(s) of the end-user device, is also transferred from those input unit(s) to the relevant user-mode/user-level application; such as, the browser or the native application of the Relying Entity that resides and runs as a user-mode application on the end-user device (with the relevant time-stamps of each time-point of data entry or user interaction). The transaction data, as received at the application from the input unit(s), is typically sent to the Relying Entity server; however, even if a secure communication channel is used (e.g., HTTPS or SSL/TLS communication), such transaction data may be manipulated by an attacker, for example, due to a malware that may reside and may be running on the end-user device, and/or due to a Man-in-the-Middle (MITM) attack during the transport of the transaction data from the end-user device to the Relying Entity server.

The SPMS stores securely, or has direct secure access to a secure memory region that stores: (i) the Private Key of the end-user device; (ii) the biometric template or biometric profile of the user, namely, one or more biometric data-items (e.g., fingerprint scan, voice sample, face image, eye/retina image) that were collected from the user in an initial onboarding/registration process and are used as "reference values" for comparison/matching purposes; (iii) fresh or subsequent biometric samples or biometric data-items or biometric measurements, with their associated time-stamps indicating the time-points of their collection; (iv) fresh or subsequent transaction data items, indicating data that was entered by the user to indicate transactions that the user requested or submitted; (v) optionally, one or more identifiers, that are unique per each transaction, and that are not a time-stamp, and that are agreed between the SPMS and the Relying Entity server, in order to replace (or to augment) relying on a time-stamp which may differ based on time-differences between a local clock and a server clock.

Figure 2:
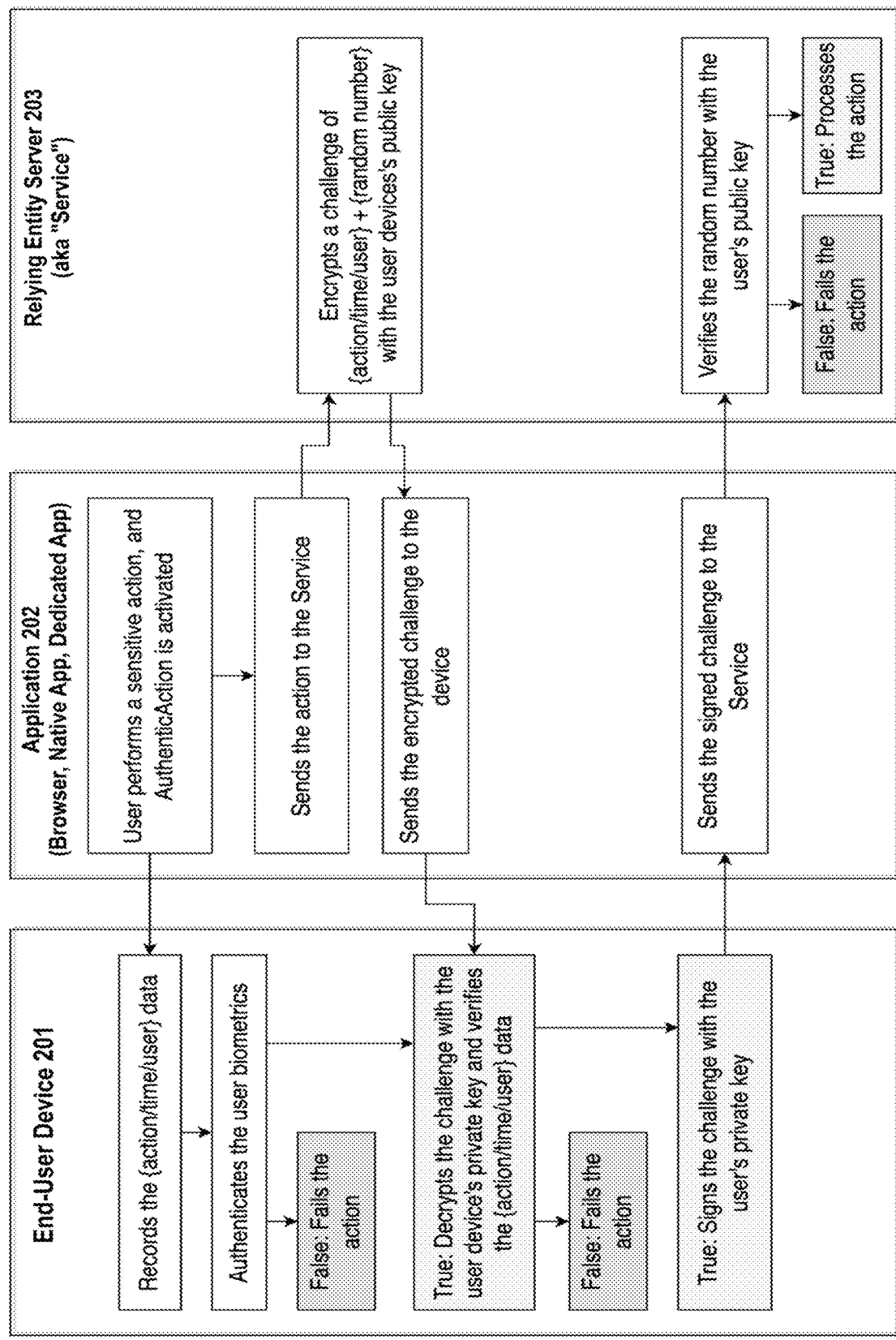
FIG. 2 is a schematic illustration demonstrating a flow of operations within a system, in accordance with some demonstrative embodiments.

Reference is made to FIG. 2, which is a schematic illustration demonstrating a flow of operations within a system 200, in accordance with some demonstrative embodiments. System 200 includes an end-user device 201 running an application 202, which is in communication with a Relying Entity Server 203.

In a first demonstrative flow of transaction verification/authentication, the following operations may be performed.

(A) The Relying Entity server generates a nonce (e.g., a long pseudo-random number), saves it on that server, and constructs a Challenge Message that contains (i) that nonce, and (ii) a copy of the transaction data that the Relying Entity server received from the end-user device, and (iii) one or more time-stamps (or other unique identifier of the transaction intended for verification).

(B) The Relying Entity server encrypts the Challenge Message with the Public Key of the end-user device, and sends the encrypted Challenge Message to the end-user device over a secure communication channel.

(C) The end-user device receives the encrypted Challenge Message; the SPMS of the end-user device decrypts the Challenge Message using the Private Key of the end-user device (which is securely stored in the SPMS, or which is securely stored in the end-user device and the SPMS has secure access to such secure storage).

(D) The SPMS extracts from the decrypted Challenge Message its components.

(E) The SPMS finds, in its secure storage or in the end-user device's secure storage, the biometric measurements that are associate with the particular time-stamp that was contained in the Challenge Message; or, the biometric measurements that are associate with the particular transaction-identifier that was contained in the Challenge Message; and the SPMS compares them to the biometric template/profile (or the pre-stored biometric "reference values") that were securely stored during the onboarding/registration process. If the comparison result is negative (no match), then the SPMS proceeds to initiate a signal that denies or rejects or fails or unauthorizes the submitted transaction, or the SPMS refrains from sending back any response message to the Challenge Message (and thus the Remote Entity server will abort or fail the submitted transaction after T seconds elapsed without receiving the correct (or any) Response Message to the Challenge Message). In contrast, if the comparison result is positive (there is a match), then the SPMS proceeds to the next step.

(F) In the next step, the SPMS compares between (I) the transaction data as extracted from the Challenge Message, and (II) the transaction data that were stored in the SPMS. For example, the SPMS selects, from a plurality of submitted transactions that were stored in the SPMS, the particular transaction whose time-stamp (or, its unique identifier) matches the time-stamp (or the unique identifier) that was included in the Challenge Message. If the comparison of the transaction data gives a negative result (no match), then, the SPMS proceeds to initiate a signal that denies or rejects or fails or unauthorizes the submitted transaction, or the SPMS refrains from sending back any response message to the Challenge Message (and thus the Remote Entity server will abort or fail the submitted transaction after T seconds elapsed without receiving the correct (or any) Response Message to the Challenge Message). In contrast, if the comparison result is positive (there is a match), then the SPMS proceeds to the next step.

(G) In the next step, the SPMS takes the nonce that was extracted from the Challenge Message; encrypts it (e.g., digitally signs it) using the Private Key of the end-user device; further encrypts it using the Public Key of the Relying Entity server (e.g., to prevent an eavesdropper from obtaining the nonce during its transport, if it was transported non-encrypted); and provides the encrypted nonce to the application (or browser) that runs on the end-user device and that is responsible for communicating with the Relying Entity server. This application sends the encrypted nonce to the Relying Entity server, as a Response Message to the Challenge Message.

(H) The Relying Entity server receives the Response Message; and decrypts it using the Public Key of the end-user device (which is accessible to entities outside the end-user device); extracts from it the nonce; and checks whether the nonce that was just received in the Response Message, matches the nonce that was generated and included in the Challenge Message. If the checking result is positive, then the Relying Entity server authorizes the transaction and proceeds to execute it (or, in some embodiments, triggers another process or another unit that further handles the transaction as a Verified Transaction). In contrast, if the checking result is negative, or if no Response Message was received within T seconds of sending the Challenge Message, then the Relying Entity server abort or fails or denies the transaction.

It is noted that in some embodiments, optionally, a video that was captured during the data-entry process by the end-user, or at least a portion of that captured video, may be included as part of the Transaction Data that is securely transmitted from the end-user device to the Relying Entity server; for example, to enable the Relying Entity server to perform one or more analysis operations on such video in order to check, or to check independently or autonomously, or to re-check (e.g., further to a prior check by the SPMS of the end-user device), that the transaction data that was received at the Relying Entity server are indeed authentic (e.g., based on auxiliary signals or modulations that can be extracted from the video). Such video may also be stored at (or by) the Relying Entity server, for future reference, for maintaining an audit trail, for establishing or proving an authenticity of a transaction, and/or for other purposes.

In a second demonstrative flow of transaction verification/authentication, the following operations may be performed.

(AA) The user enters transaction data via the input unit(s) of the end-user device, while fresh biometric data is collected via biometric sensor(s) of the end-user device. The transaction data is sent from the browser or the relevant application on the end-user device, to the Relying Entity server; however, the Relying Entity server does not yet execute the transaction, since it does not yet know whether the transaction data have integrity or authenticity (e.g., it is possible that a malware on the end-user device, or a Man-in-the-Middle attacker, have modified or manipulated or replaced the transaction data prior to their arrival at the Relying Entity server). The Relying Party server is configured to wait up to T seconds (e.g., up to 60 seconds) for a well-formed Verification Message, as a condition for actually executing the transaction.

(BB) The fresh biometric data is compared immediately, by the SPMS of the end-user device, to the "biometric reference values" (biometric template, biometric profile) that was established for the end-user during his onboarding/registration process. If the comparison result is negative (no match), then the SPMS determines that the transaction data was entered by an attacker or a malware or an un-authorized user; and aborts or fails the transaction, or generates a signal or message that aborts the transaction, or refrains from generating a "transaction verified" signal or message (which, in turn, will cause the transaction to be aborted within T seconds, at the Relying Entity server). In contrast, if the comparison result is positive (the biometrics match), then the SPMS proceeds to the next step.

(CC) At the end-user device, upon entry of the transaction data by the user: the SPMS takes the transaction data, for the transaction whose biometrics were indeed matched correctly (based on transaction time-stamp);

and encrypts the transaction data with the Private Key of the end-user device, to form an encrypted Verification Message.

(DD) The encrypted Verification Message is sent from the end-user device (e.g., by the browser or the relevant application) to the Relying Entity server, over a secure communication channel (e.g., HTTPS or SSL/TLS).

(EE) The Relying Entity server receives the encrypted Verification Message; decrypts it using the Public Key of the end-user device; and extracts from it the transaction data. The Relying Entity server compares between (i) the transaction data as extracted from the encrypted Verification Message, and (ii) the original transaction data that was received (e.g., typically within the past minute or the past few minutes) from the end-user device. If the comparison result is negative (no match), the Relying Party server determines that the original transaction data had been manipulated or tampered with; and the Relying Party server aborts or denies the transaction that is reflected in the original transaction data. It is noted that in accordance with some embodiments, the Relying Party server does not authorize and does not execute a transaction based on the transaction data that appeared in the encrypted Verification Message; since the main goal of the encrypted Verification Message is to provide a secondary verification to an already-submitted transaction, and not to provide primary transaction details for processing.

In some implementations, optionally, the Remote Entity server may utilize Fast Identity Online (FIDO) authentication, in addition to the above-mentioned first or second process; such that the above-mentioned first or second process does not interfere with the FIDO authentication process. In some embodiments, the Relying Entity server may define (e.g., per transaction, or per type-of-transaction, or via API) which particular transactions (or types-of-transaction) require Elevated Security; and may perform the above-mentioned first or second process in parallel to (or before, or after) the FIDO operations, or in addition to the FIDO operations.

In some embodiments, the above-mentioned first process or second process may be performed in combination with performing FIDO authentication operations. For example, the Relying Entity server may generate a unique nonce; and may encrypt it using the Private Key of the Relying Entity server, to form an encrypted Challenge Message, which is sent to the end-user device; then, the end-user device receives the encrypted Challenge Message, decrypts it using the Public Key of the Relying Entity server, and extracts from it the unique nonce; then, the SPMS of the end-user device takes that unique nonce, and encrypts it with the Private Key of the end-user device, to form an encrypted Response Message, which is sent from the end-user device to the Relying Entity server. Then, the Relying Entity server decrypts the encrypted Response Message using the Public Key of the end-user device, extracts from it the nonce, and checks whether this freshly-received nonce matches the unique nonce that was inserted by the Relying Entity server into the Challenge Message. If the checking result is negative (no match), then the Relying Entity server determines that the communication between the Relying Entity server and the end-user device is compromised, or determines that the end-user device is compromised.

Some embodiments may be used for preventing or detecting fraud, or fraud attempts, or cyber-attacks, in a variety of implementations; for example, preventing or detecting malware-based fraud, fraud due to automatic scripts, MITM attacks, MITB attacks, Remote Access Trojan (RAT) attacks, overlay window/overlay content attacks; "coffee break fraud" (e.g., legitimate user leaves his smartphone/laptop on the table and goes away for two minutes to get coffee, and an attacker uses the un-attended device to submit a transaction); fraud by a "friendly" party who may have partially-legitimate access to the device (e.g., a laptop computer shared by a family, in which a child attempts to perform a transaction while a parent account is already logged-in); fraud by a housekeep or a caregiver who has physical access to a household device or an office device that was left un-attended or logged-in; fraud and/or attacks that utilize phishing, credential stuffing, keylogger data/credential collection, malware-based credential/data collection, attacks that manipulate or overcome or bypass two-factor authentication (2FA), such as via a vishing attack, a SIM card swapping attack or a SIM-Swap attack, social engineering attacks, 2FA code compromise attacks; or the like.

The Applicants have realized that conventional cybersecurity systems focus on user authentication "at the gate", namely, they try to authenticate the user One Time only, at the time that the user performs a log-in process; and also, at most, they try to utilize fraud-indicative signals in order to request additional authentication (e.g., the user of a bank account submits a wire transfer to a new payee/recipient). The Applicants have realized that such conventional systems may fail because fraud is performed at the Transaction level; and that there is a need for an innovative system that hermetically and seamlessly biometrically authenticates, signs, and secures any online action or transaction, in a way that guarantees that a specific action or transaction was performed (or submitted) by the actual legitimate user and nobody else; by simultaneously or concurrently capturing and verifying both the action (transaction) and the user identity.

In some embodiments, optionally, one or more of the operations described above and/or herein, may be implemented via a dedicated application or "app", a native application or "app", a stand-alone application, a browser, a browser extension or add-on or plug-in or toolbar, or the like.

In some embodiments, the protection scheme may be integrated directly into the hardware, the Operating System (OS) and the browser, to create a vertically integrated solution that provides enhanced fraud prevention, combined with an efficient and friendly user experience; wherein the device's biometric sensors and algorithms are used locally for leveraging device biometric capabilities.

In some embodiments, the system may implement other and/or additional mechanism to further secure or verify or authenticate the submitted transaction. For example, the end-user device has an encryption/decryption mechanism that utilizes a pair of private key/public key. The end-user device securely stores its own private key; for example, in a secured memory unit, or in a Trusted Execution Environment, or in non-rewriteable/non-modifiable memory. The end-user device may be configured to digitally sign, using the device's private key, the data that is captured/recorded by the hardware sensors (e.g., the video file recorded by the camera; the audio file recorded by the microphone), prior to transmitting or sending such audio/video file to a remote server or to a relying party or to an online transaction verification service, that performs an analysis of (i) the transaction data that was submitted as part of the requested transaction, and (ii) the markers or indicators that are reflected in the audio/video file due to modulations or vibrations or audio noises or typing-hands or the like. The remote server or the relying party or the online transaction verification service utilizes the public key that is advertised by the end-user device, in order to verify the integrity of the digital signature on the received file.

In some embodiments, optionally, additional steps may be performed as a condition for approving a submitted transaction, or as a condition for reaching a determination that the submitted transaction is authentic or verified. For example, in response to receiving an incoming request to approve a particular transaction, the remote server or the relying party or the online transaction verification process may send a challenge message to the end-user device. The challenge message may include, encoded or encrypted or hashed in it, the transaction data that was received at the remote server; so that the end-user device can perform local, on-device, verification that the transaction data that was received at the remote server, indeed matches the genuine transaction data that was entered locally by the end-user (and not modified or replaced by a locally-running malware) and that was transmitted over a communication network (and not modified or replaced by a MITM attacker).

For example, the end-user enters the data-item "alexander" on his smartphone; the smartphone is configured to generate audible noises upon the pressing of each key on the keyboard; the smartphone is configured to continuously record audio during the data-entry process. The transaction data (e.g., the data-item "alexander") file is transmitted from the end-user device to the remote server. However, during the transmission, a MITM attacker replaces the word "alexander" with the word "bob" in the transaction data. The remote server receives the (modified, tampered) transaction data; analyzes or parses it; detects that the data-item has 3 characters ("bob"); and sends to the end-user device (over a secure communication channel, such as HTTPS) a Challenge Message that says "I received a data-item having three characters". The end-user device receives the Challenge Message. The end-user device performs, locally in that device, analysis of the recorded audio file; and discovers that Nine audio clicks are heard (because the legitimate user had typed "alexander"); therefore, the end-user device determines that the Transaction Data was tampered or replaced on its way to the remote server; and the end-user device responds to the Challenge Message with a "transaction canceled" message or with a "transaction voided" message or with a "verification failed" message (e.g., transmitted to the remote server over a secure channel, such as HTTPS); thus ensuring that the tampered/modified transaction would fail and will not be approved for execution.

For demonstrative purposes, some portions of the discussion above and/or of the drawings may describe some embodiments as pertaining to verifying authenticity of a financial transaction (e.g., a wire transfer submitted to a bank by an end-user); however, this is only a non-limiting example, and some embodiments may be used in conjunction with verifying and/or authenticating a variety of other operations and/or online operations and/or data-items; for example, for verifying and/or authenticating a content or a portion of an email message or a web-mail (web-based email) message or an Instant Messaging (IM) message (e.g., WhatsApp message, Signal message, Telegram message, iMessage on Apple devices); for verifying and/or authenticating data of a retail transaction or an e-commerce transaction (e.g., to verify that an order that is placed through a website or an application of an online merchant was indeed entered by the authorized legitimate user and was not tampered-with during its data entry or during the transport of the data to a remote server); for verifying and/or authenticating data that an end-user enters and submits as part of a request or petition or application (e.g., a request or an application for a new credit card; a request or an application to open a new bank account or brokerage account); or the like. In some embodiments, a developer or a service provide may define, using the API or other mechanisms, that a particular data-item or form or data-entry screen would be protected with Elevated Security as described above; such that, for example, when a user types an email or a message, auxiliary signals and/or modulations would be used by the system in order to protect and verify the data-entry process). Other suitable implementations may be used.

Some embodiments provide a computerized method for verification of user identity and transaction data authenticity. The computerized method is implementable in a system that comprises an electronic device that communicates with a remote server. The computerized method comprises: (a) at the electronic device: receiving user inputs from a user that enters transaction data; securely authenticating said user via a biometric authentication process; transmitting transaction data to the remote server; (b) at the remote server: receiving transaction data from the electronic device; pseudo-randomly generating a cryptographic nonce, and storing it in the remote server as a server-side copy of the cryptographic nonce; generating a Server-Side Challenge Message, by encrypting (i) the cryptographic nonce and (ii) the transaction data and (iii) a current time-stamp, with the Cryptographic Public Key of said electronic device as encryption key; transmitting the Server-Side Challenge Message to the electronic device; (c) at the electronic device: receiving the Server-Side Challenge Message; decrypting the Server-Side Challenge Message, by utilizing a Cryptographic Private Key of said electronic device as a decryption key, to generate a decrypted version of the Server-Side Challenge Message; extracting from the decrypted version of the Server-Side Challenge Message: (i) the cryptographic nonce, and (ii) the time-stamp that was stored within the Server-Side Challenge Message, and (iii) the transaction data that was stored within the Server-Side Challenge Message; (d) at the electronic device: checking whether the transaction data, that was stored within the Server-Side Challenge Message, matches transaction data that was locally stored in a secure memory unit within the electronic device when said transaction data was entered; and if it does not match, then: generating a signal that voids or cancels the transaction; (e) at the electronic device: checking whether the time-stamp, that was stored within the Server-Side Challenge Message, matches a time-stamp that was locally stored in the secure memory unit within the electronic device when said transaction data was entered; and if it does not match, then: generating a signal that voids or cancels the transaction; (f) at the electronic device: generating a Client-Side Response Message, by encrypting the cryptographic nonce that was extracted in step (c) from the decrypted version of the Server-Side Challenge Message, with a Private Cryptographic Key of said electronic device as an encryption key; transmitting the Client-Side Response Message from said electronic device to said remote server; (g) at the remote server: receiving the Client-Side Response Message from said electronic device; decrypting the Client-Side Response Message from said electronic device, by utilizing the Cryptographic Public Key of said electronic device as decryption key, to generate a decrypted version of the Client-Side Response Message; checking whether (i) a value of the cryptographic nonce that is extracted from the decrypted version of the Client-Side Response Message, matches (ii)

the server-side copy of the cryptographic nonce; and if it does not match, then: generating a signal that voids or cancels the transaction.

In some embodiments, the operation of "encrypting" a message while utilizing a particular Key as the "encryption key", may include a process in which that particular Key is utilized for digitally signing on said message, instead of (or in addition to) actual encryption of the payload of that message. Similarly, in some embodiments, the operation of "decrypting" a message while utilizing a particular Key as the "decryption key", may include a process in which that particular Key is utilized for verifying the authenticity of a digital signature on said message, instead of (or in addition to) actual decryption of the payload of that message.

In some embodiments, step (a) comprises: at said electronic device, securely authenticating said user via a biometric authentication process that includes at least capturing a video segment of the user while he enters transaction data into said electronic device, and utilizing one or more signals or data-items extracted from said video to authenticate said user.

In some embodiments, step (a) comprises: at said electronic device, securely authenticating said user via a biometric authentication process that includes at least capturing a video segment of the user while he enters transaction data into said electronic device and while the electronic device generates a device-generated background audio interference, and utilizing one or more signals or data-items extracted from said video to authenticate said user and to check whether said video reflects the device-generated background audio interference.

In some embodiments, step (a) comprises: at said electronic device, securely authenticating said user via a biometric authentication process that includes at least capturing a video segment of the user while he enters transaction data into said electronic device and while the electronic device generates a device-generated vibration interference, and utilizing one or more signals or data-items extracted from said video to authenticate said user and to check whether said video reflects the device-generated vibration interference.

In some embodiments, step (a) comprises: at said electronic device, securely authenticating said user via a biometric authentication process that includes at least capturing a video segment of the user while he enters transaction data into said electronic device and while the electronic device generates a device-generated illumination interference effect, and utilizing one or more signals or data-items extracted from said video to authenticate said user and to check whether said video reflects the device-generated illumination interference effect.

In some embodiments, step (a) comprises: securely authenticating said user via a biometric authentication process that includes at least: (I) at the electronic device, while the user enters transaction data, producing a device-generated interference event that causes a video-capturable anomaly or an audio-capturable anomaly; (II) performing content analysis, of video content captured by a video camera of said electronic device or of audio content captured by a microphone of said electronic device, and checking whether or not the content analysis detects said video-capturable anomaly or audio-capturable anomaly; (III) if the content analysis does not detect said video-capturable anomaly or audio-capturable anomaly, then: generating a signal that voids or cancels the transaction.

Some embodiments provide a computerized process for verification of user identity and transaction data authenticity. The computerized process is implementable in a system that comprises an electronic device that communicates with a remote server. The computerized process comprises: (a) at the electronic device: receiving user inputs from a user that enters transaction data; generating a Transaction Data Message in a non-secure execution environment of the electronic device; transmitting the Transaction Data Message from the electronic device to the remote server; (b) at the electronic device: while the user inputs transaction data in step (a), securely performing biometric authentication of the user, and storing, in a secure memory unit of the electronic device, a secure copy of the transaction data as entered by the user; (c) at a secure execution environment of the electronic device: taking the secure copy of the transaction data as entered by the user, and encrypting it into a Client-Side Encrypted Message, by utilizing a Cryptographic Private Key of the electronic device as encryption key; (d) transmitting the Client-Side Encrypted Message, from the electronic device to the remote server; (e) at the remote server: receiving the Transaction Data Message from the electronic device; delaying execution of a transaction that is requested in the Transaction Data Message, until arrival and verification processing of the Client-Side Encrypted Message at the remote server; (f) at the remote server: receiving the Client-Side Encrypted Message at the remote server; decrypting the Client-Side Encrypted Message, by using a Cryptographic Public Key of the electronic device as decryption key; and extracting from the Client-Side Encrypted Message an additional version of the transaction data that was encrypted by the secure execution environment of the electronic device; (g) at the remote server: checking whether (i) the transaction data that was extracted in step (f) from the Client-Side Encrypted Message at the remote server, matches (ii) the transaction data that was received at the remote server in step (e) as part of the Transaction Data Message; and if they do not match, then: generating a signal that voids or cancels the transaction.

In some embodiments, step (b) comprises: at said electronic device, securely authenticating said user via a biometric authentication process that includes at least capturing a video segment of the user while he enters transaction data into said electronic device, and utilizing one or more signals or data-items extracted from said video to authenticate said user.

In some embodiments, step (b) comprises: at said electronic device, securely authenticating said user via a biometric authentication process that includes at least capturing a video segment of the user while he enters transaction data into said electronic device and while the electronic device generates a device-generated background audio interference, and utilizing one or more signals or data-items extracted from said video to authenticate said user and to check whether said video reflects the device-generated background audio interference.

In some embodiments, step (b) comprises: at said electronic device, securely authenticating said user via a biometric authentication process that includes at least capturing a video segment of the user while he enters transaction data into said electronic device and while the electronic device generates a device-generated vibration interference, and utilizing one or more signals or data-items extracted from said video to authenticate said user and to check whether said video reflects the device-generated vibration interference.

In some embodiments, step (a) comprises: at said electronic device, securely authenticating said user via a biometric authentication process that includes at least capturing a video segment of the user while he enters transaction data into said electronic device and while the electronic device generates a device-generated illumination interference effect, and utilizing one or more signals or data-items extracted from said video to authenticate said user and to check whether said video reflects the device-generated illumination interference effect.

In some embodiments, step (a) comprises: securely authenticating said user via a biometric authentication process that includes at least: (I) at the electronic device, while the user enters transaction data, producing a device-generated interference event that causes a video-capturable anomaly or an audio-capturable anomaly; (II) performing content analysis, of video content captured by a video camera of said electronic device or of audio content captured by a microphone of said electronic device, and checking whether or not the content analysis detects said video-capturable anomaly or audio-capturable anomaly; (III) if the content analysis does not detect said video-capturable anomaly or audio-capturable anomaly, then: generating a signal that voids or cancels the transaction.

Some embodiments provide a computerized process for verification of user identity and transaction data authenticity. The computerized process is implementable in a system that comprises an electronic device that communicates with a remote server. The computerized process comprises: (a) receiving user interactions at a non-secure execution environment of the electronic device, reflecting transaction data entered by a user; and transmitting transaction data from the non-secure execution environment to the remote server; (b) locally authenticating the transaction data and user identity in a secure execution environment of the electronic device; and encrypting transaction data in the secure execution environment of the electronic device, by utilizing a Cryptographic Private Key of the electronic device as encryption key; and transmitting encrypted version of locally-authenticated transaction data from the electronic device to the remote server; (c) at the remote server: (c1) receiving the transaction data that was sent in step (a) from the non-secure execution environment to the remote server, and delaying transaction execution until arrival and verification processing of said encrypted version; (c2) receiving said encrypted version, and decrypting it by utilizing a Cryptographic Public Key of the electronic device as decryption key; (c3) checking whether or not transaction data obtained in step (c1), match transaction data obtained in step (c2); and if they do no match, then: generating a signal that voids or cancels the transaction.

In some embodiments, the locally authenticating in step (b) comprises: at said electronic device, securely authenticating said user via a biometric authentication process that includes at least capturing a video segment of the user while he enters transaction data into said electronic device, and utilizing one or more signals or data-items extracted from said video to authenticate said user.

In some embodiments, the locally authenticating in step (b) comprises: at said electronic device, securely authenticating said user via a biometric authentication process that includes at least capturing a video segment of the user while he enters transaction data into said electronic device and while the electronic device generates a device-generated background audio interference, and utilizing one or more signals or data-items extracted from said video to authenticate said user and to check whether said video reflects the device-generated background audio interference.

In some embodiments, the locally authenticating in step (b) comprises: at said electronic device, securely authenticating said user via a biometric authentication process that includes at least capturing a video segment of the user while he enters transaction data into said electronic device and while the electronic device generates a device-generated vibration interference, and utilizing one or more signals or data-items extracted from said video to authenticate said user and to check whether said video reflects the device-generated vibration interference.

In some embodiments, the locally authenticating in step (b) comprises: at said electronic device, securely authenticating said user via a biometric authentication process that includes at least capturing a video segment of the user while he enters transaction data into said electronic device and while the electronic device generates a device-generated illumination interference effect, and utilizing one or more signals or data-items extracted from said video to authenticate said user and to check whether said video reflects the device-generated illumination interference effect.

In some embodiments, the locally authenticating in step (b) comprises: at said electronic device, (i) parsing a program code that requests to invoke a data-entry mechanism that requires that while the user types transaction data in the electronic device, a microphone of the electronic device would capture audio and a front-facing camera of the electronic device would capture video; (ii) in response to said program code, invoking said data-entry mechanism by activating said microphone and by activating said front-facing camera; and also, causing the electronic device to produce a device-generated video-capturable interference or a device-generated audio-capturable interference while the user is entering transaction data into the electronic device; (iii) in response to said program code, performing content analysis of at least one of: (I) audio captured by said microphone of the electronic device, (II) video captured by the front-facing camera of the electronic device; and determining from said content analysis whether or not captured content reflects a device-generated audible modulation or a device-generated visible modulation that was generated and introduced by the electronic device during entry of transaction data by the user.

In some embodiments, step (b) comprises: securely authenticating said user via a biometric authentication process that includes at least: (I) at the electronic device, while the user enters transaction data, producing a device-generated interference event that causes an audio-capturable anomaly; (II) performing content analysis, of audio content captured by a microphone of said electronic device, and checking whether or not the content analysis detects said audio-capturable anomaly; (III) if the content analysis does not detect said audio-capturable anomaly, then: generating a signal that voids or cancels the transaction.

In some embodiments, step (b) comprises: securely authenticating said user via a biometric authentication process that includes at least: (I) at the electronic device, while the user enters transaction data, producing a device-generated interference event that causes a video-capturable anomaly; (II) performing content analysis, of video content captured by a video camera of said electronic device, and checking whether or not the content analysis detects said video-capturable anomaly; (III) if the content analysis does not detect said video-capturable anomaly, then: generating a signal that voids or cancels the transaction.

In some embodiments, a "video-capturable" device-generated event includes a device-generated event whose existence and/or its timing and/or its time-length and/or its pattern and/or its time-duration and/or its characteristics can be deduced from analysis of video content that is captured by a camera (and particularly, for example, by analysis of video content captured by a front-facing camera or imager) of the electronic device (e.g., the same electronic device that the user is utilizing to enter transaction data; the event occurring while the user is entering transaction data). For example, illuminating the screen of a laptop computer, or its border, in yellow border for one second and then in red border for one second, and repeating those illumination three more times, can be an eight-second long video-capturable event, since the front-facing camera of the laptop computer is expected to capture a video of the user's face that turns slightly yellow and slightly red (alternating this way four times in total) at the timing of those illumination events; and similarly, a microphone of that same electronic device is not expected to notice such illumination events, as they are visible but not audible.

In some embodiments, a "microphone-capturable" or "audio-capturable" device-generated event includes a device-generated event whose existence and/or its timing and/or its time-length and/or its pattern and/or its time-duration and/or its characteristics can be deduced from analysis of audio content that is captured by a microphone of the electronic device (e.g., the same electronic device that the user is utilizing to enter transaction data; the event occurring while the user is entering transaction data). For example, causing that electronic device to produce four Beep sounds (spaced apart by 0.25 seconds of silence) at a first frequency, followed by two seconds of silence and followed by four other Beep sounds (spaced apart by 0.5 seconds of silence) at a second frequency, can be an audio-capturable or microphone-capturable event, since the microphone of the laptop computer is expected to capture an audio segment that includes those specific Beep patterns with their particular timings, overlaid or superimposed upon other ambient noises or background noises from the vicinity of the user; and similarly, a video camera or imager of that same electronic device, that captures only video/images and not sounds, is not expected to notice such Beeping/audible events, as they are audible but not visible.

In some embodiments, a single device-generated event can be both "video-capturable" and also "microphone-capturable"/"audio-capturable" at the same time. For example, causing that electronic device which is a smartphone to vibrate three times (e.g., spaced apart by 0.5 seconds of non-vibrations) at a first vibration length (e.g., 1 second), followed by two seconds of non-vibrations, and followed by four other vibrations of the smartphone (e.g., spaced apart by 0.2 seconds of non-vibrations) at a second vibration length (e.g., 0.7 seconds), can be both video-capturable and also audio-capturable microphone-capturable; as the microphone of the smartphone may capture the "Bzzz" sound of each vibration event, and the video camera/imager of the smartphone may capture video whose visual content depicts slight vibrations (e.g., the human face is slightly vibrating in the video, exactly when the smartphone was vibrating).

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A computerized method for verification of user identity and transaction data authenticity,
   wherein the computerized method is implementable m a system that comprises an electronic device that communicates with a remote server,
   wherein the electronic device comprises: a first hardware processor that is configured to execute code, and a first memory unit that is configured to store code and data;
   wherein the remote server comprises: a second hardware processor that is configured to execute code, and a second memory unit that is configured to store code and data;
   wherein the computerized method comprises:
   (a) at the electronic device:
   receiving user inputs from a user that enters transaction data;
     securely authenticating said user via a biometric authentication process;
     securely storing the transaction data in a secure memory unit within the electronic device;
     securely storing, in said secure memory unit within the electronic device, a transaction time-stamp;
     transmitting the transaction data to the remote server;
   (b) at the remote server:
     receiving the transaction data from the electronic device;
     pseudo-randomly generating a cryptographic nonce, and storing it in the remote server as a server-side copy of the cryptographic nonce;
     generating a Server-Side Challenge Message, by encrypting (i) the cryptographic nonce and (ii) the transaction data and (iii) a current time-stamp, with a Cryptographic Public Key of said electronic device as encryption key;
     transmitting the Server-Side Challenge Message to the electronic device;
   (c) at the electronic device:
     receiving the Server-Side Challenge Message;
     decrypting the Server-Side Challenge Message, by utilizing a Cryptographic Private Key of said electronic device as a decryption key, to generate a decrypted version of the Server-Side Challenge Message;

extracting from the decrypted version of the Server-Side Challenge Message: (i) the cryptographic nonce, and (ii) the time-stamp that was stored within the Server-Side Challenge Message, and (iii) the transaction data that was stored within the Server-Side Challenge Message;

locating a relevant transaction based on the time-stamp that was extracted from the decrypted version of the Server-Side Challenge Message;

(d) at the electronic device:
checking whether the transaction data, that was stored within the Server-Side Challenge Message, matches the transaction data that was locally stored in the secure memory unit within the electronic device when said transaction data was entered;
and if it does not match, then: generating a signal that voids or cancels the transaction;

(e) at the electronic device:
checking whether the time-stamp, that was stored within the Server-Side Challenge Message, matches the transaction time-stamp that was locally stored in the secure memory unit within the electronic device when said transaction data was entered;
and if it does not match, then: generating a signal that voids or cancels the transaction;

(f) at the electronic device:
generating a Client-Side Response Message, by encrypting the cryptographic nonce that was extracted in step (c) from the decrypted version of the Server-Side Challenge Message, with the Cryptographic Private Key of said electronic device as an encryption key;
transmitting the Client-Side Response Message from said electronic device to said remote server;

(g) at the remote server:
receiving the Client-Side Response Message from said electronic device;
decrypting the Client-Side Response Message from said electronic device, by utilizing the Cryptographic Public Key of said electronic device as decryption key, to generate a decrypted version of the Client-Side Response Message;
checking whether (i) a value of the cryptographic nonce that is extracted from the decrypted version of the Client-Side Response Message, matches (ii) the server-side copy of the cryptographic nonce;
and if it does not match, then: generating a signal that voids or cancels the transaction.

2. The computerized method of claim 1,
wherein step (a) comprises:
at said electronic device, securely authenticating said user via a biometric authentication process that includes at least capturing a video segment of the user while the user enters the transaction data into said electronic device, and utilizing one or more signals or data-items extracted from said video segment to authenticate said user.

3. A computerized system for verification of user identity and transaction data authenticity,
wherein the computerized system comprises an electronic device that communicates with a remote server;
wherein the electronic device comprises: a first hardware processor that is configured to execute code, and a first memory unit that is configured to store code and data;
wherein the remote server comprises: a second hardware processor that is configured to execute code, and a second memory unit that is configured to store code and data;
wherein the computerized system is configured to perform a process comprising:

(a) at the electronic device:
receiving user inputs from a user that enters transaction data;
securely authenticating said user via a biometric authentication process;
securely storing the transaction data in a secure memory unit within the electronic device;
securely storing, in said secure memory unit within the electronic device, a transaction time-stamp;
transmitting the transaction data to the remote server;

(b) at the remote server:
receiving the transaction data from the electronic device;
pseudo-randomly generating a cryptographic nonce, and storing it in the remote server as a server-side copy of the cryptographic nonce;
generating a Server-Side Challenge Message, by encrypting (i) the cryptographic nonce and (ii) the transaction data and (iii) a current time-stamp, with a Cryptographic Public Key of said electronic device as encryption key;
transmitting the Server-Side Challenge Message to the electronic device;

(c) at the electronic device:
receiving the Server-Side Challenge Message;
decrypting the Server-Side Challenge Message, by utilizing a Cryptographic Private Key of said electronic device as a decryption key, to generate a decrypted version of the Server-Side Challenge Message;
extracting from the decrypted version of the Server-Side Challenge Message: (i) the cryptographic nonce, and (ii) the time-stamp that was stored within the Server-Side Challenge Message, and (iii) the transaction data that was stored within the Server-Side Challenge Message;
locating a relevant transaction based on the time-stamp that was extracted from the decrypted version of the Server-Side Challenge Message;

(d) at the electronic device:
checking whether the transaction data, that was stored within the Server-Side Challenge Message, matches the transaction data that was locally stored in the secure memory unit within the electronic device when said transaction data was entered; and if it does not match, then: generating a signal that voids or cancels the transaction;

(e) at the electronic device:
checking whether the time-stamp, that was stored within the Server-Side Challenge Message, matches the transaction time-stamp that was locally stored in the secure memory unit within the electronic device when said transaction data was entered; and if it does not match, then: generating a signal that voids or cancels the transaction;

(f) at the electronic device:
generating a Client-Side Response Message, by encrypting the cryptographic nonce that was extracted in step (c) from the decrypted version of the Server-Side Challenge Message, with the Cryptographic Private Key of said electronic device as an encryption key;
transmitting the Client-Side Response Message from said electronic device to said remote server;

(g) at the remote server:

receiving the Client-Side Response Message from said electronic device; decrypting the Client-Side Response Message from said electronic device, by utilizing the Cryptographic Public Key of said electronic device as decryption key, to generate a decrypted version of the Client-Side Response Message;

checking whether (i) a value of the cryptographic nonce that is extracted from the decrypted version of the Client-Side Response Message, matches (ii) the server-side copy of the cryptographic nonce;

and if it does not match, then: generating a signal that voids or cancels the transaction.

\* \* \* \* \*